United States Patent
Tabuchi et al.

(10) Patent No.: US 7,084,931 B2
(45) Date of Patent: Aug. 1, 2006

(54) PROJECTION VIDEO DEVICE

(75) Inventors: Toshiaki Tabuchi, Okayama (JP); Shinya Sannohe, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 541 days.

(21) Appl. No.: 10/111,763

(22) PCT Filed: Aug. 27, 2001

(86) PCT No.: PCT/JP01/07342

§ 371 (c)(1),
(2), (4) Date: Apr. 26, 2002

(87) PCT Pub. No.: WO02/19027

PCT Pub. Date: Mar. 7, 2002

(65) Prior Publication Data

US 2002/0163625 A1 Nov. 7, 2002

(30) Foreign Application Priority Data

Aug. 28, 2000 (JP) .............................. 2000-256916

(51) Int. Cl.
*H04N 5/74* (2006.01)
(52) U.S. Cl. .................................................. 348/748
(58) Field of Classification Search ................ 348/748, 348/744, 750, 756; 353/31, 20, 54; 359/443
See application file for complete search history.

(56) References Cited

U.S. PATENT DOCUMENTS 5,633,691 A * 5/1997 Vogeley et al. ............. 348/771

(Continued)

FOREIGN PATENT DOCUMENTS

JP 05232432 A 9/1993

(Continued)

*Primary Examiner*—Paulos M. Natnael
(74) *Attorney, Agent, or Firm*—Snell & Wilmer L.L.P.

(57) ABSTRACT

A projection-type imaging device 1000 includes: a light source optical system 121 for emitting source light 122; image display elements 7a–7c each having a display surface 127 on which a plurality of micromirrors 301 are placed and driving the plurality of micromirrors 301 according to a control signal representing a prescribed image so as to reflect the source light 122 incident on the display surface 127 toward a first direction and a second direction differing from the first direction so as to obtain first light 10b and second light 10a, respectively; a prism 6 for transmitting the first light 10b and the second light 10a; a projection optical system 8 for projecting the first light 10b transmitted by the prism; an absorption section 19 for absorbing the second light 10b transmitted by the prism 6; and cooling sections 22, 23 and 24 for cooling the absorption section 19 by a liquid refrigerant 20. The first light 10b carries information on the prescribed image, the liquid refrigerant 20 is optically coupled to the prism 6, and the second light 10a reaches the absorption section 19 via the liquid refrigerant 20.

27 Claims, 17 Drawing Sheets

U.S. PATENT DOCUMENTS

| | | | |
|---|---|---|---|
| 5,758,956 A * | 6/1998 | Bornhorst et al. | 362/294 |
| 5,946,054 A * | 8/1999 | Sannohe et al. | 348/745 |
| 6,219,111 B1 * | 4/2001 | Fukuda et al. | 349/5 |
| 6,290,360 B1 * | 9/2001 | Konuma et al. | 353/61 |
| 6,309,074 B1 * | 10/2001 | Inbar et al. | 353/120 |
| 6,345,896 B1 * | 2/2002 | Kurosawa | 353/119 |
| 6,456,341 B1 * | 9/2002 | Jung | 348/776 |
| 6,478,429 B1 * | 11/2002 | Aritake et al. | 353/31 |
| 6,568,813 B1 * | 5/2003 | Haba et al. | 353/57 |
| 6,573,950 B1 * | 6/2003 | Hirata et al. | 348/744 |
| 6,783,245 B1 * | 8/2004 | Shiaki et al. | 353/61 |

FOREIGN PATENT DOCUMENTS

| | | |
|---|---|---|
| JP | 05264947 A | 10/1993 |
| JP | 09096867 A | 4/1997 |
| JP | 11282361 A | 10/1999 |
| JP | 2000206451 A | 7/2000 |

* cited by examiner

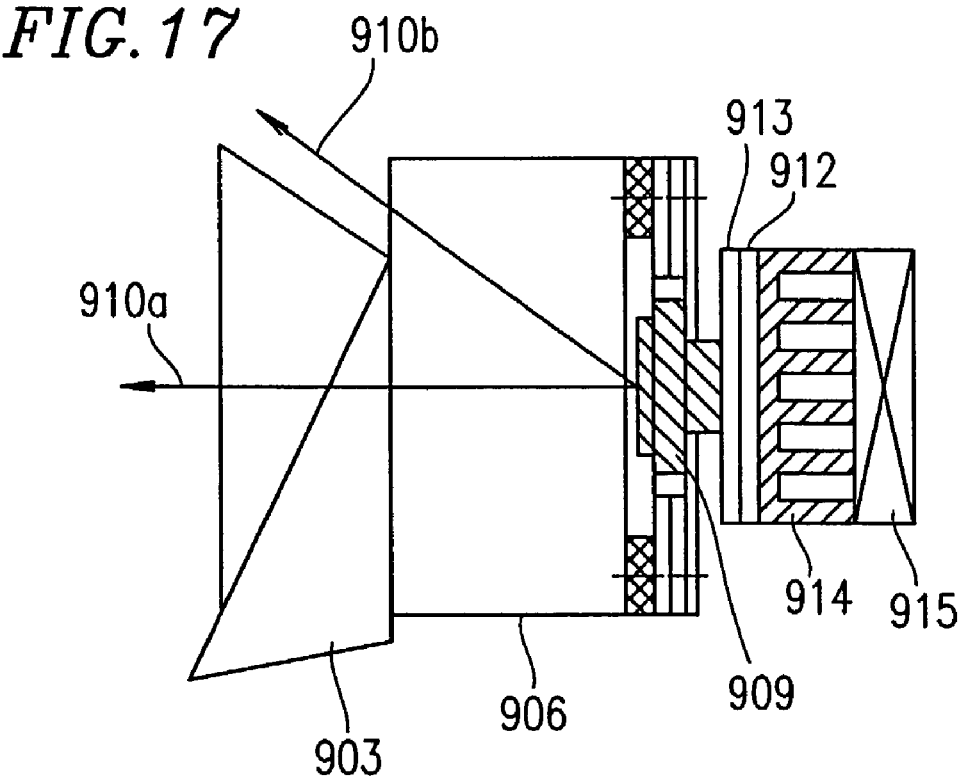

PROJECTION VIDEO DEVICE

TECHNICAL FIELD

The present invention relates to a projection-type imaging device, and specifically the present invention relates to a cooling structure used in the projection-type imaging device.

BACKGROUND ART

Recently, as digital apparatuses represented by a personal computer are coming into wide use, projection-type imaging devices, which can project an image created by such a digital apparatus onto a screen, are entering the marketplace for the purpose of presentations and the like. In the projection-type imaging device, light from a light source is modulated by an image display element for displaying the image created by the digital apparatus, and the modulated light is magnified and projected by a projection optical system.

As the digital apparatuses are high-powered, images created by the digital apparatuses have high resolution. Thus, the projection-type imaging device is required to include an image display element having higher resolution. Further, a light source of the projection-type imaging device is required to have high luminance so as to realize a bright image on the projection screen.

The image display element of the projection-type imaging device is irradiated with light from the light source. Accordingly, by providing a light source having high luminance, the image display element is irradiated with more intense light. In the case of a transmission-type image display element, a temperature thereof rises significantly when the element is irradiated with intense light. Therefore, a high-luminance projection-type imaging device uses a reflection-type image display element. Even in the reflection-type image display element, a temperature thereof rises due to some light absorption when the element is irradiated with intense light. Accordingly, provision of a structure for forcibly cooling the image display element is required.

Further, by making the image display element have high resolution, the amount of heat that the image display element itself generates becomes great. Accordingly, in order to make a high-resolution and high-luminance projection-type imaging device, a structure for efficiently cooling the image display element is required.

Light from the light source is incident on the reflection-type image display element via a prism, and the light is reflected by a display surface of the reflection-type image display element and is again incident on the prism. Therefore, by providing the high-luminance projection-type imaging device, a temperature of the prism is increased. Thus, in order to make the high-luminance projection-type imaging device, a structure for efficiently cooling the prism is required.

FIG. 17 illustrates a structure for cooling an image display element 909 of a conventional projection-type imaging device. It should be noted that in FIG. 17, one of the three primary color components of light from a light source is focused, and therefore only the image display element 909 associated with the single primary color component is shown. The image display element 909 is a reflection-type image display element of a micromirror type. A plurality of micromirrors are placed on a display surface of the image display element 909. An angle of each micromirror is changed according to a control signal representing a prescribed image, so that an image is displayed on the display surface of the image display element 909.

The image display element 909 is joined to an electronic cooling element 912 via a holder 913. For example, the electronic cooling element 912 is formed of a semiconductor.

The electronic cooling element 912 is joined to a heat sink 914 and a cooling fan 915 for cooling the heat sink 914.

Light from a light source (not shown) is incident on the image display element 909 via a TIR prism 903 and a color separation/color combining prism 906. Light reflected by the image display element 909 is directed in a direction indicated by arrows 910a or 910b according to an angle of the micromirror. Light directed in the direction indicated by arrow 910a (light 910a) carries information on an image displayed on the display surface of the image display element 909. The light 910a is transmitted by the color separation/color combining prism 906 and the TIR prism 903, and thereafter the light 910a is projected onto a screen by a projection optical system (not shown).

The image display element 909 is cooled by the holder 913, the electronic cooling element 912, the heat sink 914 and the cooling fan 915.

Light directed in the direction indicated by arrow 910b is not used for projection onto the screen, and therefore is referred herein to as "extraneous light". The extraneous light 910b is guided by the color separation/color combining prism 906 so as not to be incident on the TIR prism 903, and exits the color separation/color combining prism 906. If the extraneous light 910b is incident on the TIR prism 903, contrast in the image projected onto the screen is lowered, thereby deteriorating image quality. The extraneous light 910b is absorbed in a location (not shown) which is irradiated with the extraneous light 910b.

Another example of the cooling structure of the reflection-type image display element is shown in Japanese Laid-Open Publication No. 10-319853. In the example shown in Japanese Laid-Open Publication No. 10-319853, an image display element is joined to a metal plate having high thermal conductivity, thereby increasing an area of image display element surfaces from which heat is radiated. The metal plate is cooled via natural convection.

Still another example of the cooling structure of the reflection-type image display element is shown in Japanese Laid-Open Publication No. 10-319379. In the example shown in Japanese Laid-Open Publication No. 10-319379, cooling fans are provided on the front and rear surfaces of an image display element so as to generate air convention for cooling. Japanese Laid-Open Publication No. 10-319379 also discloses a configuration in which heat of the image display element is conducted to radiation fins by a heat pipe and the radiation fins are cooled by a cooling fan.

In the conventional configuration shown in FIG. 17, a cooling fan 915 is provided to the image display element 909. In order to enhance the cooling efficiency of the image display element 909, the volume of air generated by the cooling fan 915 must be increased by increasing the number of rotations of the cooling fan 915 or by making the cooling fan 915 larger. However, in the configuration shown in FIG. 17, vibrations of the cooling fan 915, which are inevitably increased by an increase in air volume, are directly transferred to the micromirrors included in the image display element 909, deteriorating quality of an image displayed on the image display element 909. Consequently, quality of the image projected onto the screen is deteriorated. In particular, when the image display element 909 having high resolution is used, such deterioration in image quality is significant. The vibrations generated in the cooling fan 915 also reduce precision in the alignment of the image display element 909 with respect to the color separation/color combining prism 906, so that quality of an image projected onto the screen is deteriorated.

Therefore, according to the conventional configuration shown in FIG. 17, the image display element 909 cannot be efficiently cooled.

Further, in the configuration shown in FIG. 17, the color separation/color combining prism 906 is responsible for a function of guiding the extraneous light 910*b* so as not to be incident on the TIR prism 903. Thus, the color separation/color combining prism 906 cannot be made compact.

In the cooling structure disclosed in Japanese Laid-Open Publication No. 10-319853, no cooling fan for cooling the image display element is used, and thus no problem related to deterioration in image quality due to vibrations of such a fan as described above occurs. However, cooling by natural convection does not sufficiently cool the image display element and therefore cannot be applied to a high-resolution projection-type imaging device.

In the cooling structure disclosed in Japanese Laid-Open Publication No. 10-319379, the image display element is cooled by air. Since the thermal conductivity of air is low, efficient cooling cannot be provided. Further, in such a configuration where heat of the image display element is conducted to the radiation fins by the heat pipe, there is a difficulty in adjusting a position of the image display element with respect to the prism because of the high rigidity and heavy weight of the heat pipe, thereby reducing precision in alignment. In order to make the heat pipe less rigid and lighter, the heat pipe is required to be thinner. However, if the heat pipe is made thinner, the amount of heat that the thin heat pipe conducts in a unit of time becomes less, whereby the image display element cannot be efficiently cooled.

Further, none of the above-described publications related to conventional technologies refers to cooling of a prism itself (e.g., the color separation/color combining prism 906 shown in FIG. 17). There is a problem that when a temperature of the prism is increased, dimensions of the prism vary due to thermal expansion and precision in the optical system is reduced, thereby deteriorating quality of an image projected onto the screen.

The present invention is made in view of the above-described problems. An objective of the present invention is to provide a projection-type imaging device in which a prism can be compact. Another objective of the present invention is to provide a projection-type imaging device in which a reflection-type image display element can be efficiently cooled. Still another objective of the present invention is to provide a projection-type imaging device in which the prism can be efficiently cooled.

DISCLOSURE OF THE INVENTION

A projection-type imaging device of the present invention includes: a light source optical system for emitting source light; an image display element having a display surface on which a plurality of micromirrors are placed, the image display element driving the plurality of micromirrors according to a control signal representing a prescribed image so as to reflect the source light incident on the display surface toward a first direction and a second direction differing from the first direction so as to obtain first light and second light, respectively; a prism for transmitting the first light and the second light; a projection optical system for projecting the first light transmitted by the prism; an absorption section for absorbing the second light transmitted by the prism; and a cooling section for cooling the absorption section by a liquid refrigerant, the first light carries information on the prescribed image, the liquid refrigerant is optically coupled to the prism, and the second light reaches the absorption section via the liquid refrigerant, and therefore the above described objective is achieved.

The projection-type imaging device may further include a plurality of image display elements corresponding to respective ones of a plurality of primary color components, and the prism may separate the source light into the plurality of primary color components and combine the first light for each of the primary color components.

The cooling section may include a radiator for radiating heat of the liquid refrigerant into the air around the projection-type imaging device.

The cooling section may further include a pump for circulating the liquid refrigerant through the absorption section and the radiator, and a pipeline forming a circulation path of the liquid refrigerant.

Fins may be formed on a surface of the radiator, which is in contact with the air around the projection-type imaging device, and the cooling section may further include a cooling fan for stirring the air around the radiator so as to enhance radiation effectiveness.

A circulation flow rate of the liquid refrigerant may be variably controlled according to a temperature around the projection-type imaging device.

The liquid refrigerant may be optically coupled to the prism via transparent glass and a transparent adhesive.

The absorption section may be formed of a metal material.

The absorption section may have a surface for absorbing the second light, and the surface for absorbing the second light may be black.

The absorption section may have a surface in contact with the liquid refrigerant and fins may be formed on the surface in contact with the liquid refrigerant.

An index of refraction of the liquid refrigerant may be substantially equal to an index of refraction of the prism.

Another projection-type imaging device of the present invention includes: a light source optical system for emitting source light; an image display element having a display surface on which a prescribed image is displayed according to a control signal, the light source being reflected by the display surface so as to obtain information light which carries information on the prescribed image; a prism for transmitting the information light; a projection optical system for projecting the information light transmitted by the prism; and a cooling section for cooling the prism by a liquid refrigerant, and therefore the above described objective is achieved.

The projection-type imaging device may include a plurality of image display elements corresponding to respective ones of a plurality of primary color components, and the prism may separate the source light into the plurality of primary color components and combine the information light for each of the primary color components.

The cooling section may include a radiator for radiating heat of the liquid refrigerant into the air around the projection-type imaging device.

The cooling section may further include a pump for circulating the liquid refrigerant through the absorption section and the radiator, and a pipeline forming a circulation path of the liquid refrigerant.

Fins may be formed on a surface of the radiator, which is in contact with the air around the projection-type imaging device, and the cooling section may further include a cooling fan for stirring the air around the radiator so as to enhance radiation effectiveness.

A circulation flow rate of the liquid refrigerant may be variably controlled according to a temperature around the projection-type imaging device.

Still another projection-type imaging device of the present invention includes: a light source optical system for emitting source light; an image display element having a display surface on which a prescribed image is displayed according to a control signal, the light source being reflected by the display surface so as to obtain information light which carries information on the prescribed image; a prism for transmitting the information light; a projection optical system for projecting the information light transmitted by the prism; and an element cooling section for cooling a surface of the image display element opposed to the display surface by a liquid refrigerant, and therefore the above described objective is achieved.

The projection-type imaging device may include a plurality of image display elements corresponding to respective ones of a plurality of primary color components, and the prism may separate the source light into the plurality of primary color components and combine the information light for each of the primary color components.

The element cooling section may further cool surroundings of the display surface of the image display element.

The liquid refrigerant may be optically coupled to the display surface of the image display element and the prism, and the element cooling section may further cool the display surface of the image display element with the liquid refrigerant.

The element cooling section may include a pump for circulating the liquid refrigerant, a pipeline forming a circulation path of the liquid refrigerant, and a radiator for radiating heat of the liquid refrigerant into the air around the projection-type imaging device.

The circulation flow rate of the liquid refrigerant may be variably controlled according to a temperature around the projection-type imaging device.

The element cooling section may be formed of a metal material.

The element cooling section may have a surface in contact with the liquid refrigerant and fins may be formed on the surface in contact with the liquid refrigerant.

An index of refraction of the liquid refrigerant may be substantially equal to an index of refraction of the prism.

A portion of the element cooling section, which is in contact with the display surface of the image display element, may be formed of an elastic material.

BRIEF DESCRIPTION OF THE DRAWINGS

FIG. 8B is a cross-sectional view of the first element cooling device 21a.

FIG. 10 is a cross-sectional view of a second element cooling device 26a.

FIG. 14A is a cross-sectional view showing an example of a configuration of an air chamber 43a.

FIG. 17 is a view showing a structure for cooling an image display element 909 of a conventional projection-type imaging device.

BEST MODE FOR CARRYING OUT THE INVENTION

Figure 1:
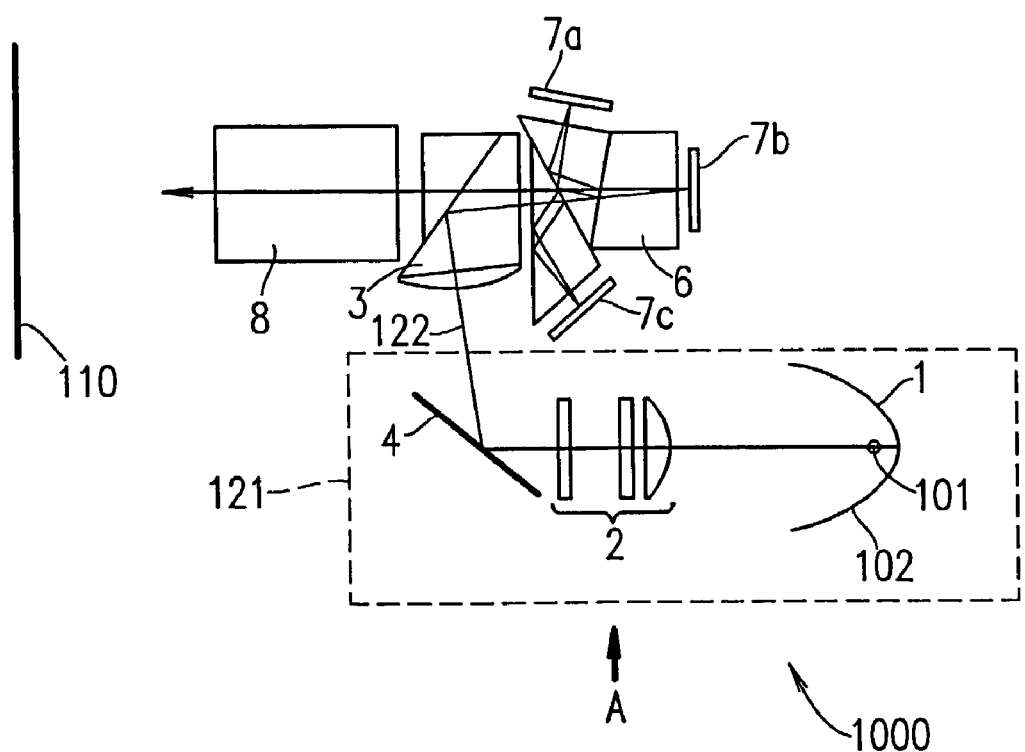
FIG. 1 is a view showing an optical system of a projection-type imaging device 1000 according to an embodiment of the present invention.

Hereinafter, embodiments of the present invention will be described with reference to the drawings. It should be noted that similar components are denoted by similar reference numerals and there are some cases where repeated descriptions are omitted.

FIG. 1 illustrates an optical system of a projection-type imaging device 1000 according to an embodiment of the present invention. The projection-type imaging device 1000 includes a light source optical system 121, image display elements 7a–7c, a TIR (Total Inner Reflecting) prism 3, a color separation/color combining prism 6 (a prism), and a projection lens unit (projection optical system) 8.

It should be noted that FIG. 1 does not illustrate structures for cooling the color separation/color combining prism 6 and the image display elements 7a–7c included in the projection-type imaging device 1000. These cooling structures are described below with reference to FIG. 2.

The light source optical system 121 emits source light 122. The "source light" described herein refers to light which is not modulated by an image display element (i.e., light which does not carry information on an image displayed on the image display element).

The light source optical system 121 includes a light source lamp unit 1, a relay lens unit 2 for collecting light (source light) from the light source lamp unit 1, and a light introducing mirror 4 for causing the light collected by the relay lens unit 2 to be incident on the TIR prism 3. The light source lamp unit 1 includes a lamp 101 and a concave mirror 102 for allowing efficient collection of light emitted by the lamp 101. In the high-resolution projection-type imaging device 1000, for example, a xenon lamp is used as the lamp 101.

For the purpose of description, FIG. 1 shows the optical system such that geometric relationships therein are different from actual geometric relationships. For example, in the actual optical system of the projection-type imaging device 1000, the source light 122 is incident on the TIR prism 3 from the back of the sheet of the drawing.

The TIR prism 3 is formed of two prisms. At an interface between the two prisms, an extremely thin air layer (not shown) is formed. The source light 122 incident on the TIR prism 3 is incident on the prism interface at an angle greater than the critical angle, and thus undergoes total internal reflection and is guided to the color separation/color combining prism 6.

A dichroic film is formed on a prism end surface of the color separation/color combining prism 6. For example, the source light 122 is white light. The source light 122 is separated into three primary color components (e.g., red, blue and green primary color components) by the color separation/color combining prism 6. Each of the primary color components is reflected by a corresponding one of display surfaces of the image display elements 7a–7a. The light reflected by the corresponding display surface is modulated according to an image displayed on the corresponding one of the display surfaces of the image display elements 7a–7c. That is, the reflected light is information light (first light) carrying information on an image.

Information light for each of the primary color components is combined with information light for the other primary color components by the color separation/color combining prism 6. After the combined information light is transmitted by the color separation/color combining prism 6, the light is transmitted by the TIR prism 3, and is magnified by the projection optical system 8 so as to be projected onto a screen 110.

Each of the image display elements 7a–7c is a reflection-type image display element. For example, each of the image display elements 7a–7c can be a reflection-type liquid crystal image display element. Alternatively, each of the image display elements 7a–7a can be a micromirror-type image display element. Each of the reflection-type liquid crystal image display element and the micromirror-type image display element is an example of the reflection-type image display element.

Figure 2:
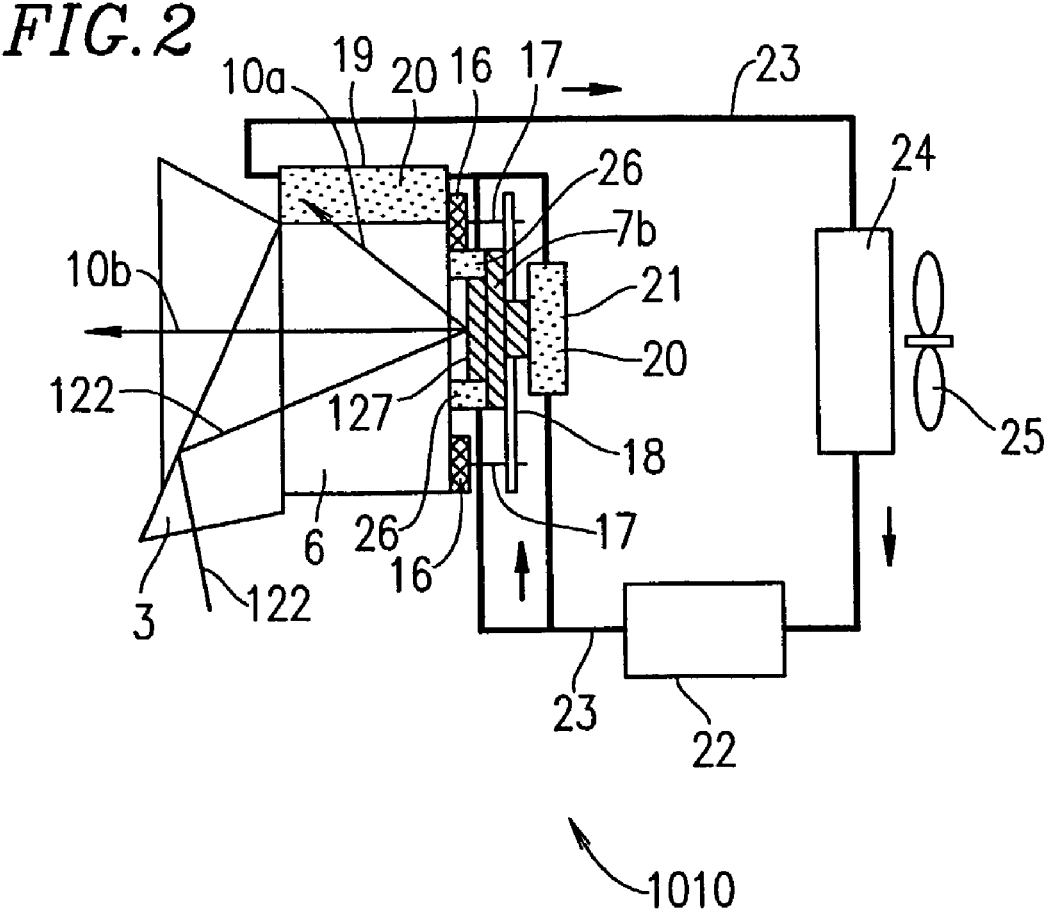
FIG. 2 is a view showing a cooling structure 1010 of the projection-type imaging device 1000 according to an embodiment of the present invention.

FIG. 2 illustrates a cooling structure 1010 of the projection-type imaging device 1000 according to an embodiment of the present invention. FIG. 2 shows the TIR prism 3 and the color separation/color combining prism 6 viewed from a direction indicated by arrow A in FIG. 1. The top surface of the sheet of FIG. 2 corresponds to the front side of the sheet of FIG. 1. In FIG. 2, the image display elements 7a and 7a among the image display elements 7a–7c shown in FIG. 1 are omitted. Optical paths associated with the image display elements 7a and 7c are also omitted. Although separation of the source light 122 into respective primary color components corresponding to the image display elements 7a–7c and combining of information light obtained by each of the image display elements 7a–7c are performed by the color separation/color combining prism 6, FIG. 2 does not illustrate the state of the separation and combining.

In this example, each of the image display elements 7a–7c is a micromirror-type image display element. The following description related to the image display element 7b is also applied to the image display elements 7a and 7c.

The image display element 7b is attached to amounting board 18. The mounting board 18 is fixed on the color separation/color combining prism 6 by an adjustment shaft holder 16 joined to the color separation/color combining prism 6 and an adjustment shaft 17 provided on the adjustment shaft holder 16. The mounting board 18 and the image display element 7b are fixed by an adhesive after their relative positions are adjusted with precision. This positional adjustment is performed using a specialized device (not shown).

The source light 122 is incident on the image display element 7b via the TIR prism 3 and the color separation/color combining prism 6.

Figure 3A:
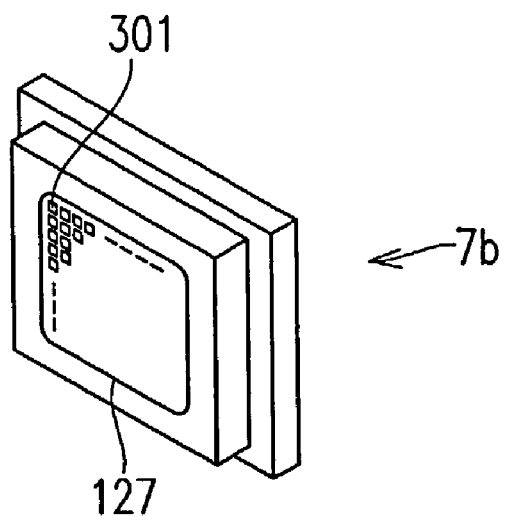
FIG. 3A is a view showing a display surface 127 of an image display element 7b.

FIG. 3A illustrates a display surface 127 of the image display element 7b. A plurality of micromirrors 301 are placed on the display surface 127. Each micromirror 301 is driven according to a control signal input to the image display element 7b. This control signal represents a prescribed image (an image for a primary color component corresponding to the image display element 7b among images intended to be projected onto the screen 110).

As a micromirror-type image display element as shown in FIG. 3A, for example, a DMD (Digital Mirror Device) element and a TMA (Thin film Micromirror Array) element have been commercialized or made public.

Figure 3B:
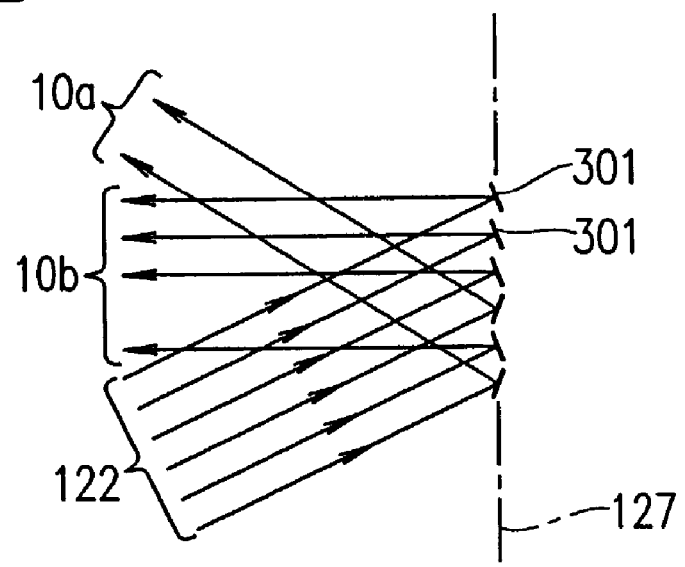
FIG. 3B is a view showing how source light 122 is reflected by the display surface 127 of the image display element 7b (FIG. 3A).

FIG. 3B illustrates how the source light 122 is reflected by the display surface 127 of the image display element 7b (FIG. 3A). In the example shown in FIG. 3B, the image display element 7b is a DMD element. In the DMD element, each micromirror 301 (a picture element) is driven according to a control signal such that an angle thereof is +10° or −10°. It should be noted that +10° and −10° each refer to an angle of each micromirror 301 with respect to the display surface 127.

Where −10° and +10° are respectively represented by "ON" and "OFF", light reflected by the micromirror 301 corresponding to "ON" forms information light lob and light reflected by the micromirror 301 corresponding to "OFF" forms extraneous light 10a. In this manner, the image display element 7b reflects the source light 122 incident on the display surface 127 via the TIR prism 3 (FIG. 2) and the color separation/color combining prism 6 toward a first direction 10b and a second direction 10a differing from the first direction 10b so as to obtain first light (information light) and second light (extraneous light), respectively. The information light 10b is modulated by the image display element 7b, i.e., it carries information on a prescribed image represented by a control signal input to the image display element 7b.

As an example of the projection-type imaging device using a DMD element as the image display element, a DLP (Digital Light Processing) system has been commercialized.

Referring again to FIG. 2, the cooling structure 1010 according to an embodiment of the present invention is described.

The color separation/color combining prism 6 transmits the information light 10b and the extraneous light 10a. The information light 10b transmitted by the color separation/color combining prism 6 is further transmitted by the TIR prism 3 so as to be projected onto the screen 110 by the projection optical system 8 (FIG. 1).

A prism cooling device 19 for cooling the color separation/color combining prism 6 by a liquid refrigerant 20 is fixed on a top face of the color separation/color combining prism 6 by an adhesive or the like. It should be noted that the "top face" of the color separation/color combining prism 6 refers to a surface located uppermost among surfaces of the color separation/color combining prism 6 in FIG. 2.

A first element cooling device 21 is fixed on a surface (back face) opposite to the display surface 127 of the image display element 7b by an adhesive, screws or the like, so as to cool the surface by the liquid refrigerant 20. Further, a second element cooling device 26 for cooling the periphery of the display surface 127 of the image display element 7b by the liquid refrigerant 20 is fixed on the circumference of the display surface 127 by an adhesive so as to be in close contact with the image display element 7b.

The liquid refrigerant 20 is circulated through the prism cooling device 19 and the first and second element cooling devices 21 and 26 by a pump 22. A circulation path of the liquid refrigerant 20 is formed by a pipeline tube 23 (pipeline). A circulation flow rate of the liquid refrigerant 20 is suitably determined according to cooling conditions of the color separation/color combining prism 6 and the image display element 7b.

The liquid refrigerant 20, which passed through the prism cooling device 19 and the first and second element cooling devices 21 and 26, is guided into a radiator 24 so as to exchange heat with air. In this manner, the heat of the liquid refrigerant 20 is radiated into ambient air.

Fins can be formed on a surface of the radiator 24 which is in contact with the ambient air. Further, the projection-type imaging device is optionally provided with a cooling fan 25 so as to forcibly cool the radiator 24 by air. The cooling fan 25 enhances efficiency in heat radiation by stirring the air around the radiator 24.

In this manner, the prism cooling device 19, the pump 22, the pipeline tube 23 and the radiator 24 function together as a cooling section for cooling the color separation/color combining prism 6 by the liquid refrigerant 20. Further, the first element cooling device 21, the pump 22, the pipeline tube 23 and the radiator 24 function together as a cooling section for cooling the surface of the image display element 7b opposite to the display surface 127 by the liquid refrigerant 20.

In the prism cooling device 19, the liquid refrigerant 20 is in direct contact with the color separation/color combining prism 6. The liquid refrigerant 20 is transparent and the extraneous light 10a from the color separation/color combining prism 6 is transmitted by the liquid refrigerant 20. The liquid refrigerant 20 is optically coupled to the color separation/color combining prism 6. It should be noted that the wording "media A and B are optically coupled to each other" used herein means that the media A and B are positioned without having an air layer between the media A and B such that light can be transmitted from the media A to the media B or vice versa.

The extraneous light 10a strikes an inner wall of the prism cooling device 19 so as to be absorbed therein. Accordingly, the prism cooling device 19 functions as the cooling section for cooling the color separation/color combining prism 6 by the liquid refrigerant 20 and at the same time it functions as an absorption section for absorbing the extraneous light 10a. Since the liquid refrigerant 20 has a function of guiding the extraneous light 10a to the absorption section, the color separation/color combining prism 6 is not required to have a configuration for guiding the extraneous light 10a to the absorption section, whereby the color separation/color combining prism 6 can be made compact. This feature is made apparent by comparing the conventional color separation/color combining prism 906 shown in FIG. 17 to the color separation/color combining prism 6 of the projection-type imaging device 1000 according to the present invention shown in FIG. 2. A height (a length in a direction from the top to bottom of the plane of the sheet of FIG. 2) of the color separation/color combining prism 6 can be reduced to about a half of that (a length in a direction from the top to bottom of the plane the sheet of FIG. 17) of the conventional color separation/color combining prism 906. The color separation/color combining prism 6 is an extremely highly precise optical element and is therefore costly. Therefore, by making the color separation/color combining prism 6 compact, reduction in production cost of the projection-type imaging device 1000 is possible.

When the prism cooling device 19 functions as the absorption section for absorbing the extraneous light 10a, the pump 22, the pipeline tube 23 and the radiator 24 function as a cooling section for cooling the absorption section by liquid refrigerant 20.

It is desirable that an index of refraction of the liquid refrigerant 20 is substantially equal to an index of refraction (n=approximately 1.5) of the color separation/color combining prism 6. Since the color separation/color combining prism 6 and the liquid refrigerant 20 are optically coupled to each other, total internal reflection does not occur at the interface between the color separation/color combining prism 6 and the liquid refrigerant 20 when the indices of refraction of the liquid refrigerant 20 and the color separation/color combining prism 6 are equal. Therefore, the extraneous light 10a is incident on the liquid refrigerant 20 inside the prism cooling device 19 and strikes the inner wall of the prism cooling device 19 so as to be absorbed therein. Consequently, the extraneous light 10a is not reflected by the interface between the color separation/color combining prism 6 and the liquid refrigerant 20 and thus is not transmitted by the color separation/color combining prism 6 so as to be incident on the TIR prism 3. Therefore, such extraneous light 10a does not deteriorate contrast in an image projected onto the screen 110 (FIG. 1).

When BK7 is used as a glass material of the color separation/color combining prism 6, the refractive index of the color separation/color combining prism 6 is 1.5. In this case, a mixed liquid of ethylene glycol (55%), diethylene glycol (30%), and glycerin (15%) can be preferably used as the liquid refrigerant 20. A refractive index of this mixed liquid is 1.44 and is substantially equal to the refractive index of the color separation/color combining prism 6. In this example, a total internal reflection angle at the interface between the color separation/color combining prism 6 and the liquid refrigerant 20 is equal to or more than 70 degrees, so that contrast in an image projected onto the screen 110 (FIG. 1) is reduced to such an extent as not to be recognized, causing no problem for practical use.

It should be noted that the wording "the indices of refraction of the color separation/color combining prism 6 and the liquid refrigerant 20 are substantially equal to each other" means that their indices of refraction are entirely equal to each other or there is a slight difference between them but the extraneous light 10a reflected at the interface between the color separation/color combining prism 6 and the liquid refrigerant 20 due to the difference is little, so that contrast in the image projected onto the screen 110 (FIG. 1) is reduced to such an extent as not to be recognized.

Figure 4:
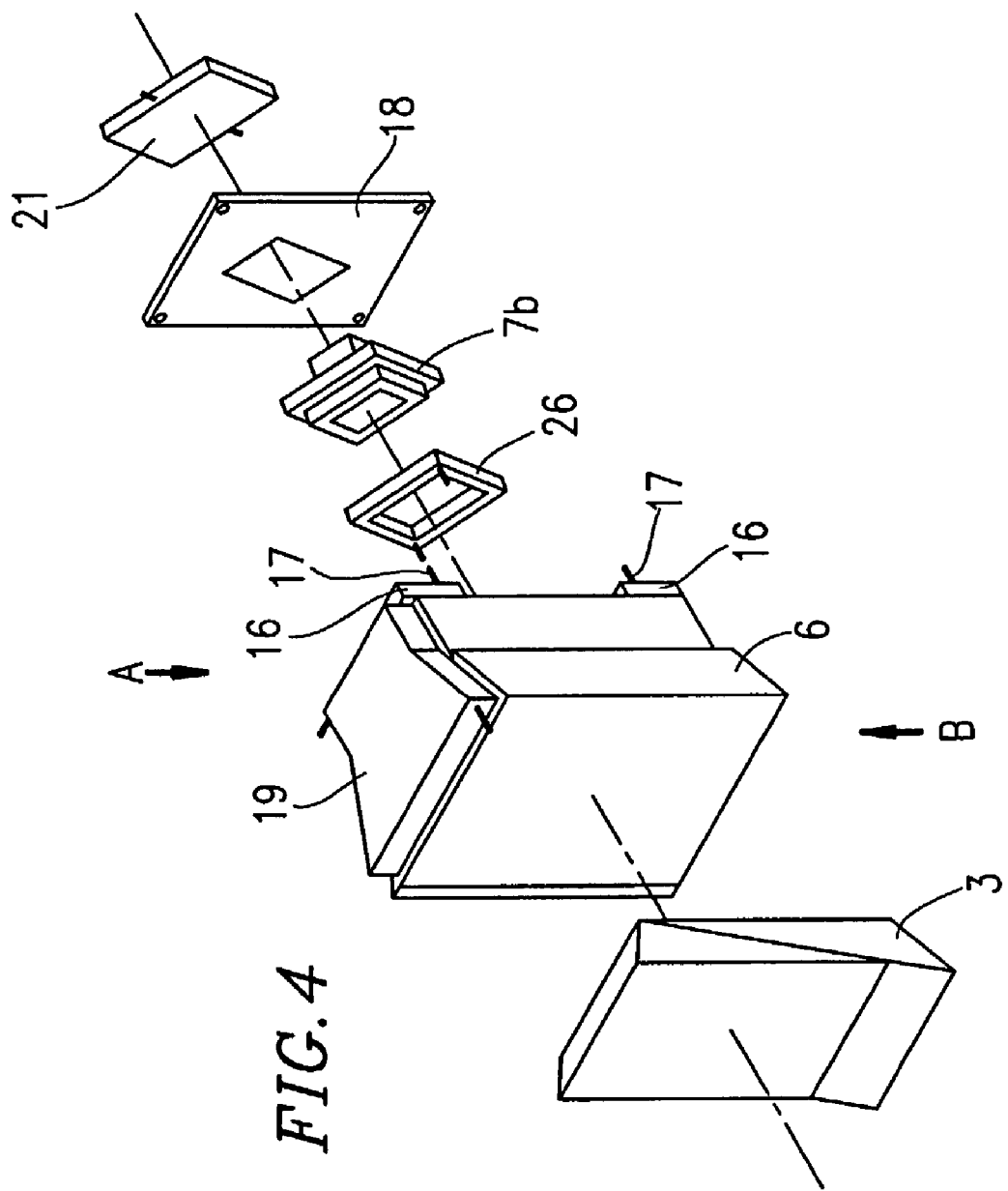
FIG. 4 is an exploded perspective view showing how a prism cooling device 19, a first element cooling device 21, and a second element cooling device 26 are mounted on a top face of a color separation/color combining prism 6, a back face of the image display element 7b, and the circumference of the display surface of the image display element 7b, respectively.

FIG. 4 is an exploded perspective view showing how the prism cooling device 19, the first element cooling device 21, and the second element cooling device 26 are mounted on a top face of the color separation/color combining prism 6, a back face of the image display element 7b, and the circumference of the display surface of the image display element 7b, respectively. In FIG. 4, the image display elements 7a and 7c shown in FIG. 1 are also omitted. However, it should be understood that the first and second element cooling devices 21 and 26 are respectively mounted on the back face and circumference of the display surface of the image display element 7a and also mounted on the image display element 7c in a similar manner to the first and second element cooling device 21 and 26 mounted on the image element display 7b shown in FIG. 4.

Figure 5:
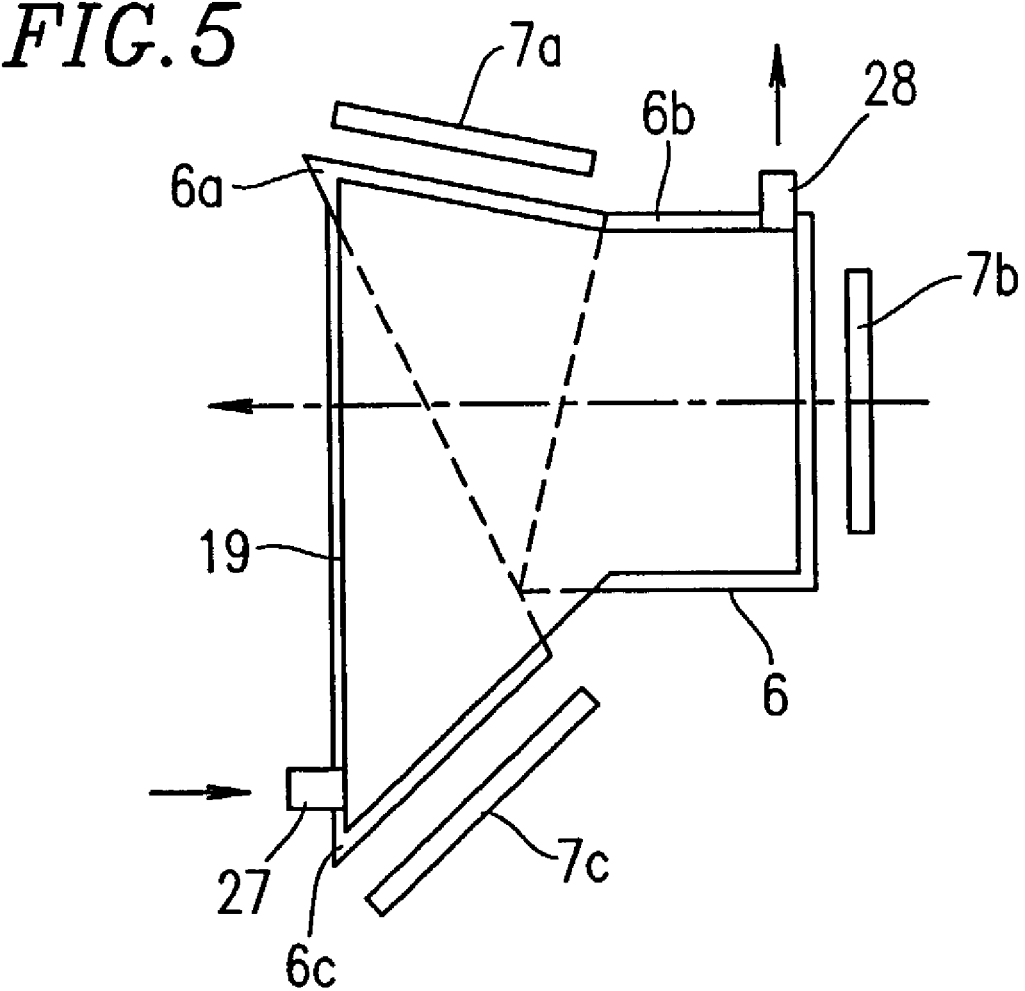
FIG. 5 is a view showing a state where the prism cooling device 19 is placed on the top face of the color separation/color combining prism 6.

FIG. 5 shows a state where the prism cooling device 19 is placed on the top face of the color separation/color combining prism 6. FIG. 5 is a view of the prism cooling device 19 and the color separation/color combining prism 6 viewed from a direction indicated by arrow A shown in FIG. 4.

Similar to the extraneous light 10a from the image display element 7b described above with reference to FIG. 2, extraneous light from each of the image display elements 7a and 7c exits the top face of the color separation/color combining prism 6 along the direction of the front side of the sheet of FIG. 5. The prism cooling device 19 is provided so as to almost entirely cover the top face of the color separation/color combining prism 6, which includes three prisms 6a–6c, in order to absorb the extraneous light from each of the image display element 7a–7c.

The prism cooling device 19 is provided with a refrigerant inlet 27 and a refrigerant outlet 28 for circulating the liquid refrigerant 20. The refrigerant inlet 27 and the refrigerant outlet 28 are connected to the pipeline tube 23 (FIG. 2). In the example shown in FIG. 5, although the prism cooling device 19 is provided with the single refrigerant inlet 27 and the single refrigerant outlet 28, the number of each of the refrigerant inlet 27 and the refrigerant outlet 28 is not limited to one.

Figure 6A:
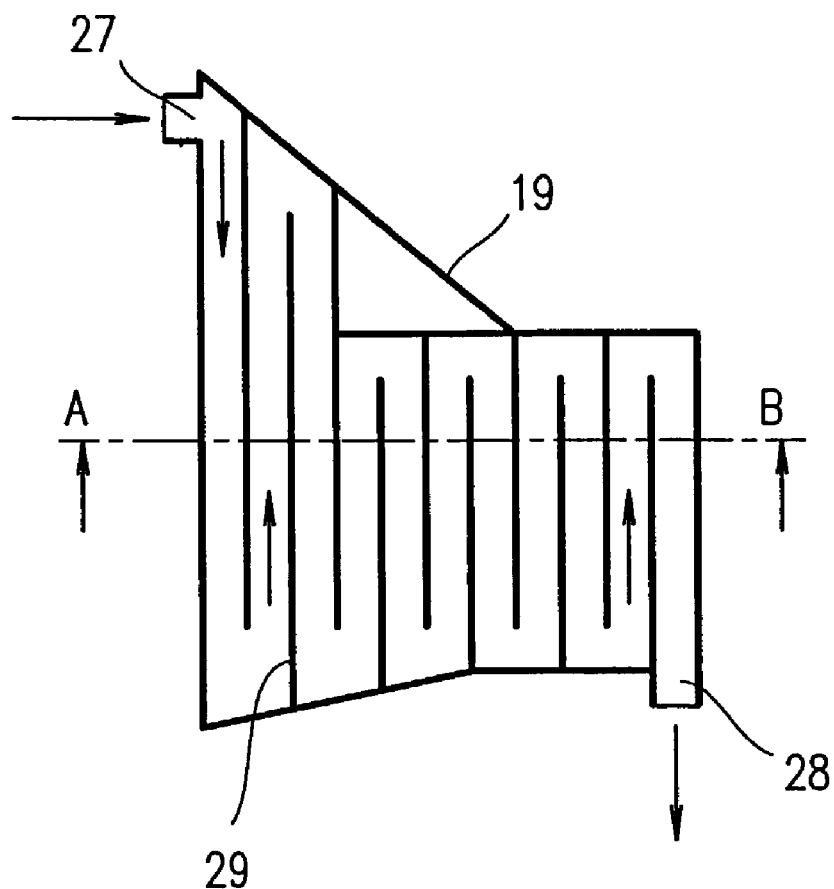
FIG. 6A is a view showing a bottom face of the prism cooling device 19.

FIG. 6A shows a bottom face of the prism cooling device 19. FIG. 6A is a view of the prism cooling device 19 viewed from a direction indicated by arrow B shown in FIG. 4.

For example, the prism cooling device 19 is formed of a metal material having superior thermal conductivity, such as aluminum or copper, and has a box-like hollow structure. As described above, the transparent liquid refrigerant 20 is enclosed between the hollow section of the prism cooling device 19 and the color separation/color combining prism 6.

Since the prism cooling device 19 has a function as an absorption section for absorbing the extraneous light 10a (FIG. 2), it is desirable that the inner wall of the prism cooling device 19 is black so as to absorb light. Alternatively, when the prism cooling device 19 is made of aluminum, it is desirable that a black oxide film is formed by black alumite treatment or the like so as to prevent erosion by the liquid refrigerant 20.

A temperature of the inner wall of the prism cooling device 19 is increased by absorbing the extraneous light 10a. The inner wall of the prism cooling device 19 is cooled by exchanging heat between the inner wall of the prism cooling device 19 and the liquid refrigerant 20. In the prism cooling device 19, the surface absorbing the extraneous 10a is in direct contact with the liquid refrigerant 20, and thus the heat is efficiently exchanged.

In general, heat exchange effectiveness depends on flow velocity of a refrigerant and heat exchange surface area. Therefore, in order to enhance the heat exchange effectiveness, it is preferable that an area of the inner wall of the prism cooling device 19, which is in contact with the liquid refrigerant 20, is as large as possible. Therefore, in the example shown in FIG. 6A, heat sink ribs (fins) 29 are formed on the inner walls of the prism cooling device 19. The heat sink ribs 29 are alternately formed on one wall and an opposed wall so as to efficiently allow the liquid refrigerant 20 to flow from the refrigerant inlet 27 to the refrigerant outlet 28.

Figure 6B:
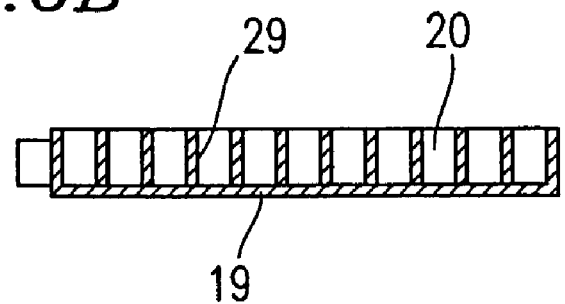
FIG. 6B is a cross-sectional view of the prism cooling device 19 taken along line A–B shown in FIG. 6A.

FIG. 6B is a cross-sectional view of the prism cooling device 19 taken along line A–B shown in FIG. 6A.

In a preferred embodiment, a height (a dimension in a top to bottom direction in FIG. 6B) of the prism cooling device 19 is about 5 mm and a thickness of each heat sink rib 29 is between 0.5 mm and 1 mm. Ethylene glycol, propylene glycol or the like can be used as the liquid refrigerant 20. When an extent of heat release in the prism cooling device 19 is about 30 W, a sufficient cooling effect can be realized with the flow rate of the liquid refrigerant 20 of about 50 cc/min.

Figure 7A:
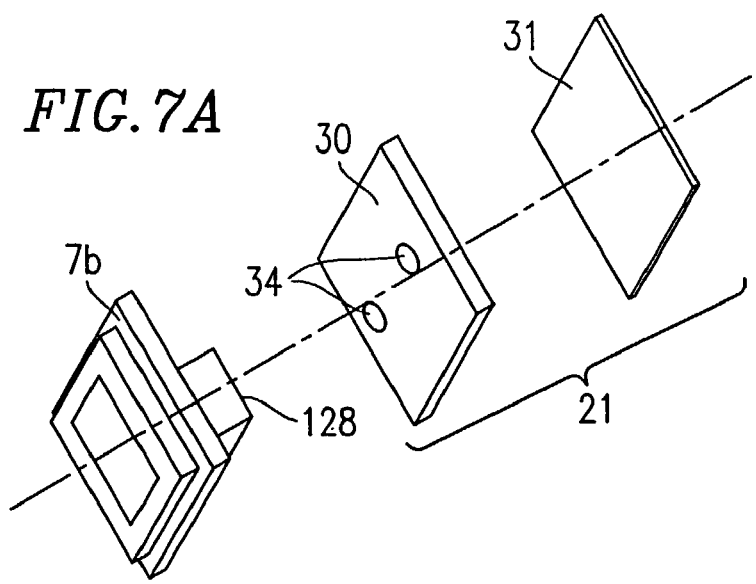
FIG. 7A is an exploded perspective view showing how the first element cooling device 21 is mounted on a back face 128 of the image display element 7b.

FIG. 7A is an exploded perspective view showing how the first element cooling device 21 is mounted on the back face 128 of the image display element 7b.

Figure 7B:
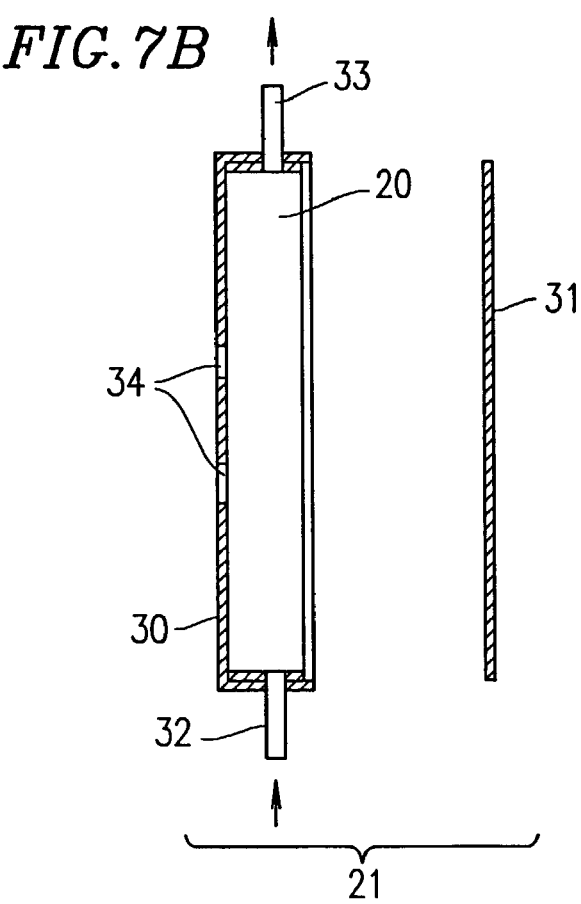
FIG. 7B is a cross-sectional view of the first element cooling device 21.

FIG. 7B is a cross-sectional view of the first element cooling device 21. The first element cooling device 21 includes a case 30 and a lid 31. The case 30 is joined to the lid 31 by an adhesive or the like so as to be sealed. For example, the case 30 and lid 31 are formed of a metal material having high thermal conductivity, such as aluminum or copper, and form a box-like hollow structure when adhered together.

The case 30 is provided with a refrigerant inlet 32 and a refrigerant outlet 33 so as to circulate the liquid refrigerant 20. Since heat is required to be conducted between the first element cooling device 21 and the image display element 7b, the first element cooling device 21 is provided so as to be in close contact with the image display element 7b. The case 30 is provided with fixation holes 34 through which screws or the like pass for closely fixing the first element cooling device 21 on the image display element 7b. Alternatively, when the first element cooling device 21 is fixed on the image display element 7b by an adhesive, the fixation holes 34 can be omitted.

Figure 8A:
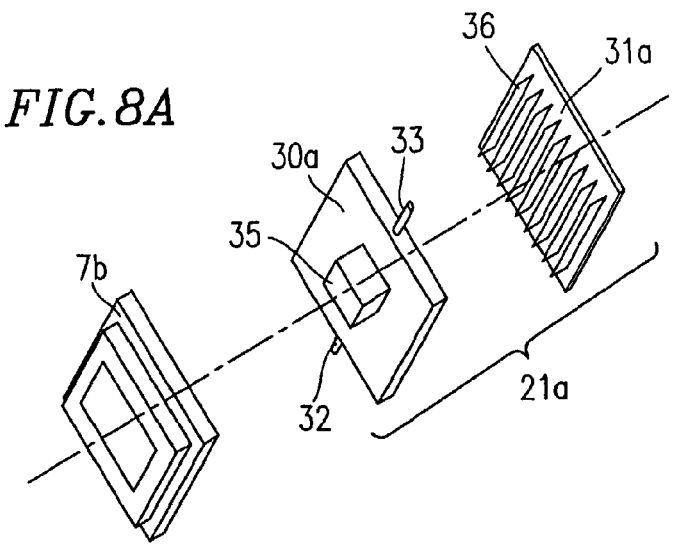
FIG. 8A is an exploded perspective view showing how a first element cooling device 21a is mounted on a back face of the image display element 7b.

FIG. 8A is an exploded perspective view showing how a first element cooling device 21a is mounted on the back face of the image display element 7b. The first element cooling device 21a can be used instead of the first element cooling device 21 described with reference to FIGS. 7A and 7B.

Figure 8B:
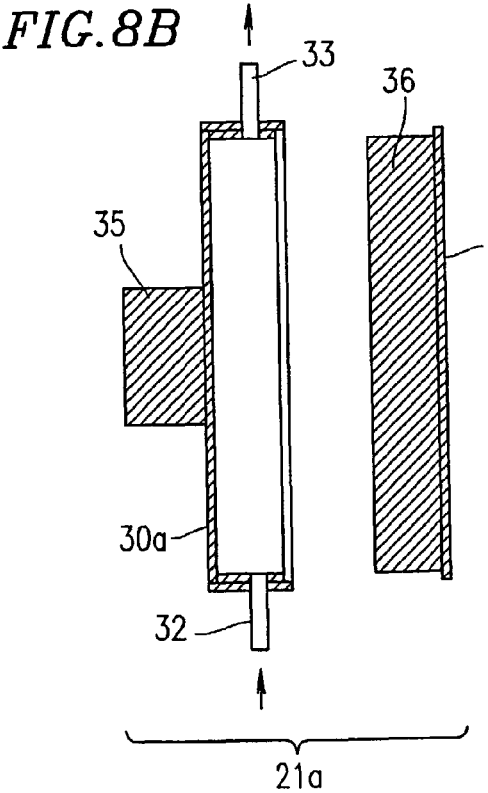

FIG. 8B is a cross-sectional view of the first element cooling device 21a. The first element cooling device 21a includes a case 30a and a lid 31a. The case 30a is joined to the lid 31a by an adhesive or the like so as to be sealed. For example, the case 30a and lid 31a are formed of a metal material having high thermal conductivity, such as aluminum or copper, and forms a box-like hollow structure when adhered together. The case 30 is provided with a refrigerant inlet 32 and a refrigerant outlet 33 so as to circulate the liquid refrigerant 20. Further, the case 30a is integrally formed with a heat conduction section 35 through which heat is conducted to or from the image display element 7b (e.g., a DMD element).

The lid 31a is provided with cooling ribs (fins) 36 at a surface in contact with the liquid refrigerant 20. This allows efficient heat exchange between the liquid refrigerant 20 and the first element cooling device 21.

Figure 8C:
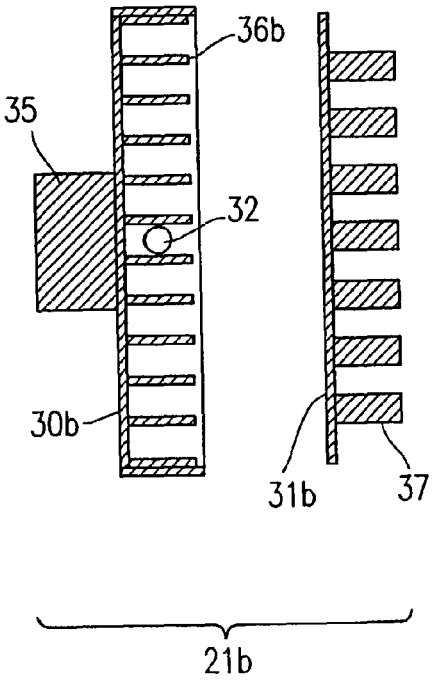
FIG. 8C is a cross-sectional view of a first element cooling device 21b.

FIG. 8C is across-sectional view of a first element cooling device 21b. The first element cooling device 21b can be used instead of the first element cooling device 21 described with reference to FIGS. 7A and 7B. The first element cooling device 21b includes a case 30b and a lid 31b.

The case 30b is provided with cooling ribs(fins) 36b at a surface in contact with the liquid refrigerant 20. This allows efficient heat exchange between the liquid refrigerant 20 and the first element cooling device 21b.

The lid 31b is provided with air-cooling ribs (fins) 37 at a surface in contact with the ambient air. This allows efficient heat exchange between the air and the first element cooling device 21b.

Figure 9A:
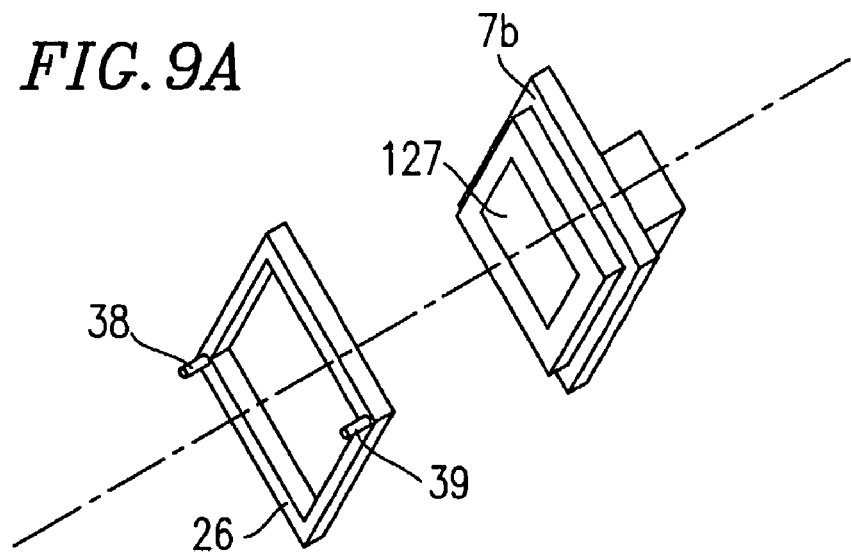
FIG. 9A is an exploded perspective view showing how the second element cooling device 26 is mounted on the circumference of the display surface 127 of the image display element 7b.

FIG. 9A is an exploded perspective view showing how the second element cooling device 26 is mounted on the circumference of the display surface 127 of the image display element 7b.

For example, the second element cooling device 26 is formed of a metal material having superior thermal conductivity, such as aluminum or copper.

Figure 9B:
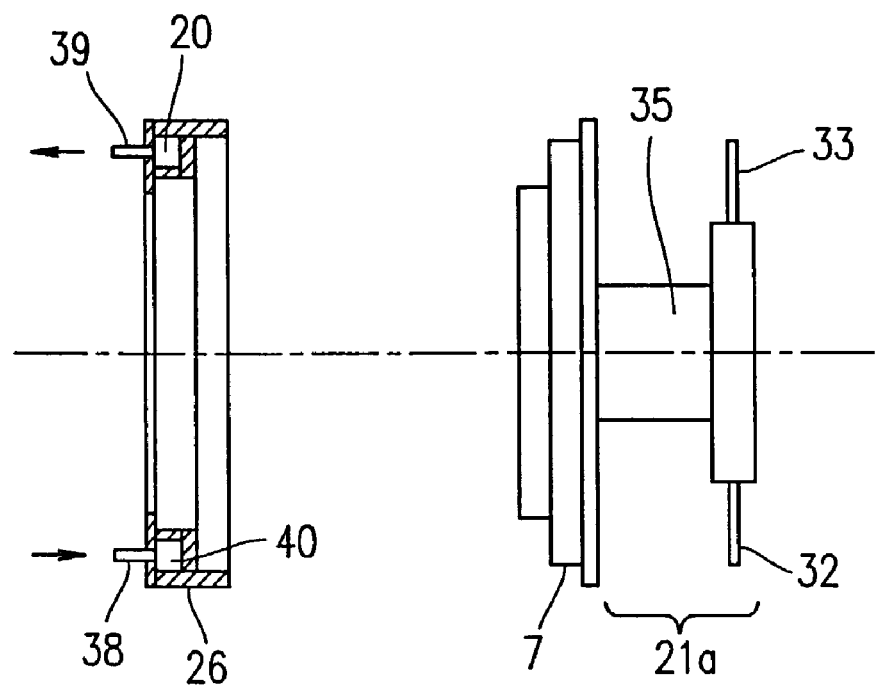
FIG. 9B is a cross-sectional view of the second element cooling device 26.

FIG. 9B is a cross-sectional view of the second element cooling device 26. It should be noted that FIG. 9B shows the image display element 7b and the first element cooling device 21a (FIGS. 8A and 8B) together with the second element cooling device 26.

A hollow portion 40 having a form of a frame is provided in the second element cooling device 26. The liquid refrigerant 20 is enclosed in the hollow portion 40. The second element cooling device 26 is provided with a refrigerant inlet 38 and a refrigerant outlet 39. Each of the refrigerant inlet 38 and refrigerant outlet 39 is connected to the pipeline tube 23 (FIG. 2).

The second cooling device 26 is closely attached to the image display element 7b by an adhesive or the like. This facilitates heat conduction from the image display element 7b to the second element cooling device 26. In FIG. 9B, for the purpose of description, the second element cooling device 26 is shown as being separated from the image display element 7b.

The heat from the image display element 7b is conducted to the second element cooling device 26 and is further transferred (via heat exchange) to the liquid refrigerant 20. As a result, the circumference of the display surface 127 of the image display element 7b is cooled.

Ideally, only the display surface 127 of the image element 7b is irradiated with the source light 122 (FIG. 2) incident on the image display element 7b (when precision of the optical system is sufficiently high). However, when the precision of the optical system of the projection-type imaging device is not sufficiently high, the circumference of the display surface 127 of the image display element 7b is irradiated with the source light 122. This may increase a temperature of the circumference of the display surface 127 of the image display element 7b.

The projection-type imaging device 1000 (FIG. 1) according to an embodiment of the present invention uses the second element cooling device 26, whereby it is possible to suppress an increase in temperature of the circumference of the display surface 127. Accordingly, an optical system (e.g., the light source optical system 121, FIG. 1) is not required to be highly precise, thereby reducing an overall production cost of the projection-type imaging device 1000.

When dust in the air adheres to the surface of the color separation/color combining prism 6 and/or the display surface 127 of the image display element 7b, an image of the dust is magnified and is projected onto the screen 110, extremely deteriorating image quality. In the projection-type imaging device 1000 according to an embodiment of the present invention, the second element cooling device 26 is used for cooling the surroundings of the display surface 127, and therefore it is not necessary to create air convection for air-cooling the surroundings of the display surface 127. Further, as can be seen from FIG. 2, a space between the image display element 7b and the color separation/color combining prism 6 is tightly enclosed by the second element cooling device 26. Accordingly, the dust in the air can be prevented from sticking to the surface of the color separation/color combining prism 6 and/or the display surface 127 of the image display element 7b, thereby preventing quality of an image projected onto the screen 110 from being deteriorated.

Figure 10:
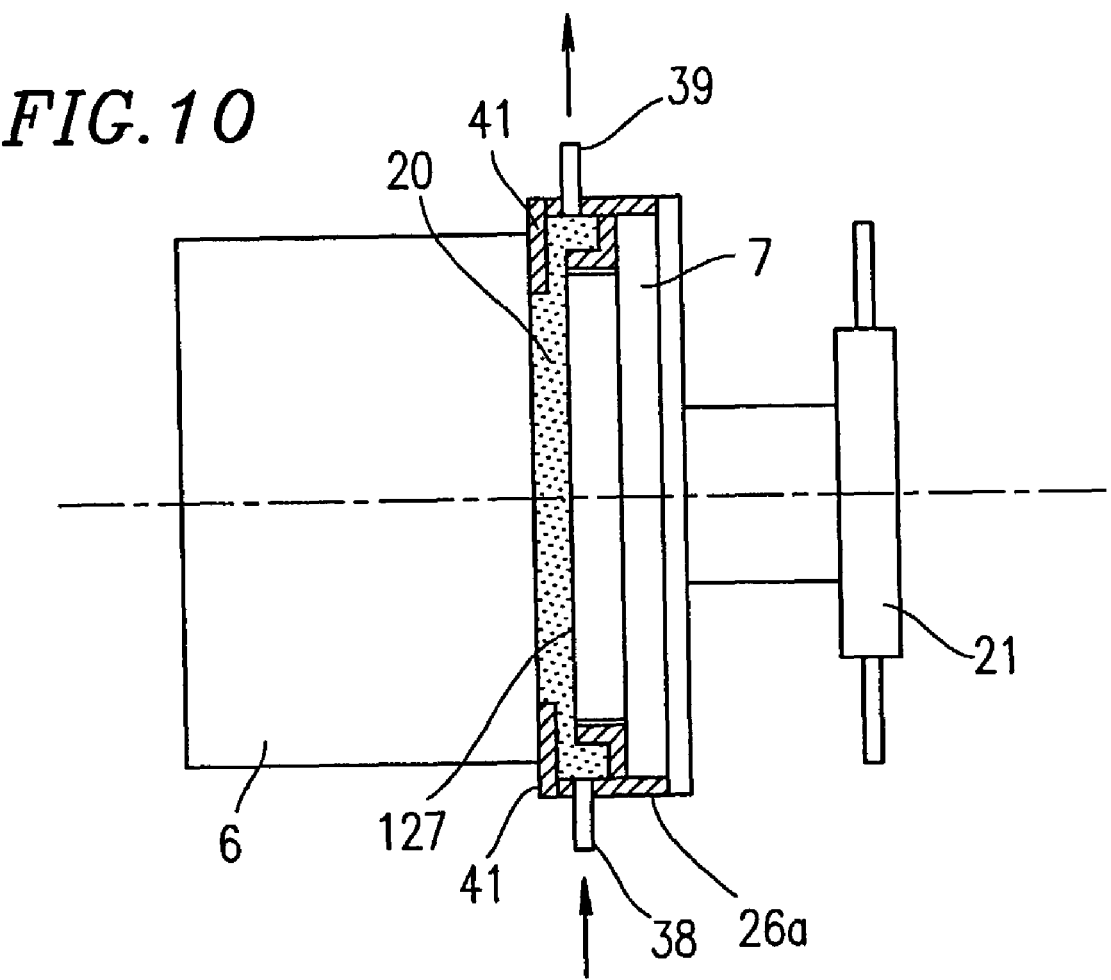

FIG. 10 is a cross-sectional view of a second element cooling device 26a. It should be noted that FIG. 10 illustrates the color separation/color combining prism 6, the image display element 7b and the first cooling device 21 as well. The second element cooling device 26a can be used instead of the second element cooling device 26 shown in FIGS. 9A and 9B.

Similar to the above-described second element cooling device 26, the second element cooling device 26a is joined to the image display element 7b. The second element cooling device 26a has a configuration in which a space between the color separation/color combining prism 6 and the display surface 127 of the image display element 7b is filled with the liquid refrigerant 20.

As a material of the element cooling device 26a, aluminum or the like, which have good thermal conductivity, can be used. Alternatively, a portion 41 of the second element cooling device 26a, which is in contact with the color separation/color combining prism 6, can be made of an elastic material (e.g., elastic rubber). This enables adjustments of a positional relationship between the color separation/color combining prism 6 and the image display element 7b while preventing leakage of the liquid refrigerant 20. Further, a portion of the second element cooling device 26a, which is in contact with the display surface 127 of the image display element 7b (or a portion which is in contact with the circumference of the display surface 127 of the image display element 7b), can be made of an elastic material.

The second element cooling device 26a has a function of also cooling the color separation/color combining prism 6 using the liquid refrigerant 20 while cooling the display surface 127 of the image display element 7b.

The liquid refrigerant 20 is optically coupled to the display surface 127 and the color separation/color combining prism 6. Preferably, an index of refraction of the liquid refrigerant 20 is substantially equal to the index of refraction (n=approximately 1.5) of the color separation/color combining prism 6. By making the index of refraction of the liquid refrigerant 20 substantially equal to the index of refraction of the color separation/color combining prism 6, reflection at the interface between the liquid refrigerant 20 and the color separation/color combining prism 6 shown in FIG. 10 can be prevented, thereby enhancing optical contrast. This enhances quality of an image projected onto the screen 110.

As described above, a mixed liquid of ethylene glycol (55%), diethylene glycol (30%) and glycerin (15%) can be preferably used as the liquid refrigerant 20.

In the second element cooling device 26*a* shown in FIG. 10, a space between the image display element 7*b* and the color separation/color combining prism 6 is filled with the liquid refrigerant 20. Therefore, quality of an image projected onto the screen 110 is not deteriorated by dust in the air adhering to the surface of the color separation/color combining prism 6 and/or the display surface 127 of the image display element 7*b*.

In this manner, with the cooling structure 1010 according to the embodiment of the present invention shown in FIG. 2, the image display element 7*b* is cooled by both the first and second element cooling devices 21 and 26 using the liquid refrigerant. Since thermal conductivity of the liquid refrigerant 20 is considerably high as compared to thermal conductivity of the air, the image display element 7*b* can be efficiently cooled.

Further, vibrations of a cooling fan is not conducted to the image display element 7*b*, and thus quality of the image projected onto the screen 110 is not deteriorated.

The extraneous light 10*a* from the image display element 7*b* is absorbed in the prism cooling device 19 (an absorption section). The prism cooling device 19 can be efficiently cooled by the liquid refrigerant 20.

The prism cooling device 19 also functions as a cooling section for efficiently cooling the color separation/color combining prism 6 by the liquid refrigerant 20.

Needless to say, the above-described effects are applied to the image display elements 7*a* and 7*c* (FIG. 1).

It should be noted that FIG. 2 shows an example in which the prism cooling device 19 and the first and second element cooling devices 21 and 26 are connected to one another via a common one-system circulation path. However, a separate circulation path can be provided to each of the prism cooling device 19 and the first and second element cooling devices 21 and 26.

In such a case, a liquid refrigerant used in the respective circulation paths for the first and second element cooling devices 21 and 26 is not necessarily transparent. This is because the liquid refrigerants used in these circulation paths are not required to be optically coupled to the color separation/color combining prism 6 or the display surface 127 of the image display element 7*b*.

Furthermore, it is not essential that all of the prism cooling device 19 and the first and second element cooling devices 21 and 26 are provided to the projection-type imaging device 1000. Any one of the prism cooling device 19 and the first and second element cooling devices 21 and 26 can be solely used. For example, a combination of the prism cooling device 19 according to the embodiment of the present invention and the conventional image display element 7*b* can be used.

The image display element 7*b* is not necessarily a micromirror-type image display element. Any reflection-type image display element can be used as the image display element 7*b*. However, when the image display element 7*b* is not a micromirror-type image display element, the prism cooling device 19 does not function as the absorption section for absorbing the extraneous light 10*a*. This is because the extraneous light 10*a* is not created in such a case. Even when the prism cooling device 19 does not function as the absorption section for absorbing the extraneous light 10*a*, the prism cooling device 19 can function as a cooling section for cooling a prism (color separation/color combining prism 6) by the liquid refrigerant 20. In this case, the liquid refrigerant 20 is not necessarily transparent.

The inventors of the present invention carried out an experiment for measuring cooling performance data (temperature data) for the purpose of verifying a cooling effect of the cooling structure 1010 according to the above-described embodiment of the present invention shown in FIG. 2.

Figure 11:
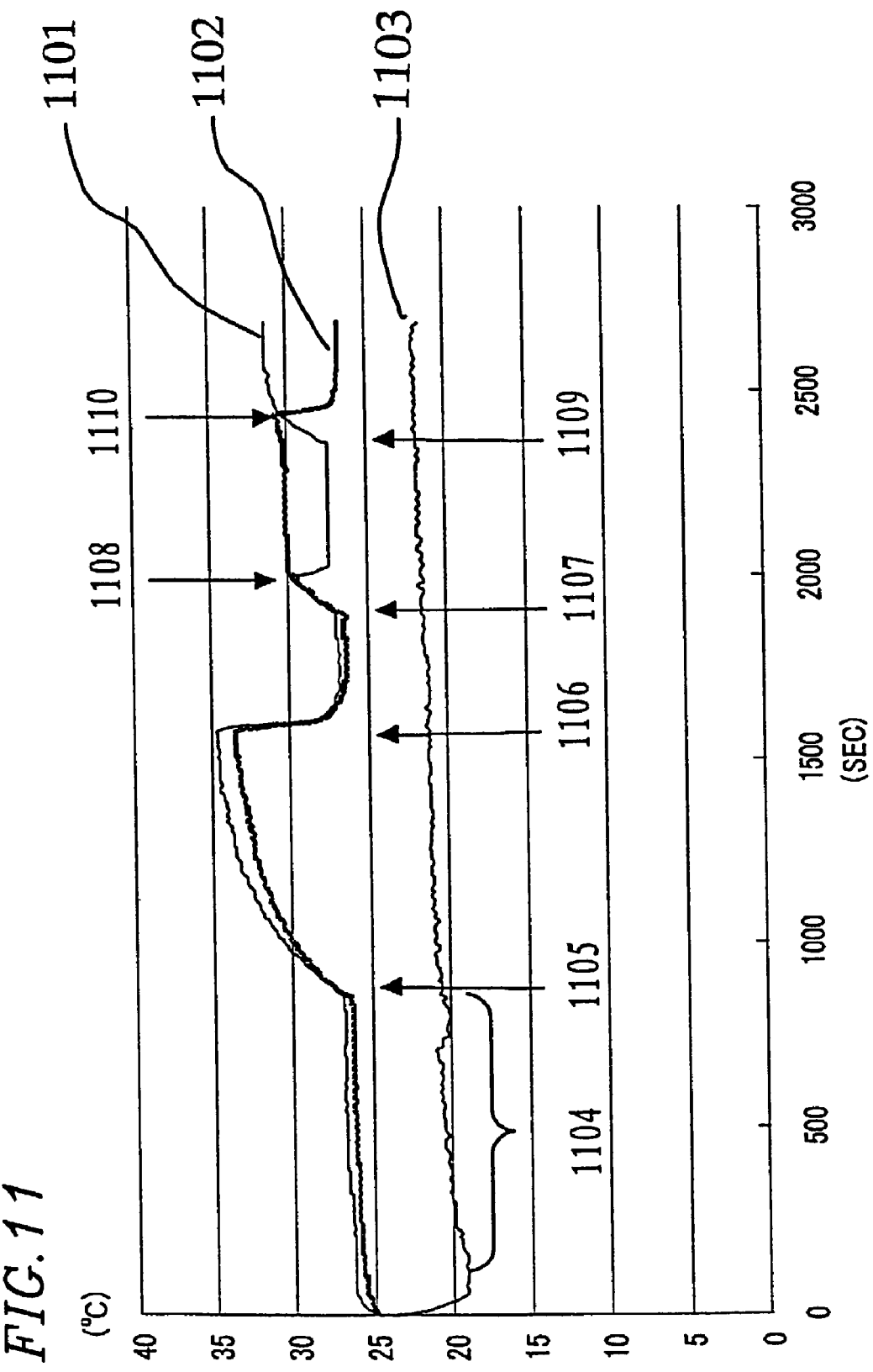
FIG. 11 is a diagram showing cooling performance data for the cooling structure 1010 (FIG. 2) according to an embodiment of the present invention.

FIG. 11 shows cooling performance data for the cooling structure 1010 (FIG. 2) according to the embodiment of the present invention. In FIG. 11, the horizontal axis denotes time elapsed since the start of the experiment, and the vertical axis denotes temperature. In FIG. 11, a thin line, reference numeral 1101 represents the temperature over time at a back face side of one of the image display elements 7*a*–7*c* (FIG. 1), and a bold line, reference numeral 1102 represents the temperature over time at a display surface side of the image display element. For reference, FIG. 11 also shows a room temperature (thin line, reference numeral 1103) in the environment under which the experiment was carried out.

In the experiment, the liquid refrigerant 20 is circulated by pump 22 (FIG. 2) via the prism cooling device 19 and the first and second element cooling devices 21 and 26 and heat is radiated into the ambient air by the radiator 24. The experimental conditions were as follows.

The liquid refrigerant 20: a water solution of ethylene glycol

Circulation flow rate: 40–66 cc/min.

Optical output from the light source lamp unit 1 (FIG. 1): 6000 ANSI lumen-hours As described below, the experiment is carried out by controlling the circulation of the liquid refrigerant 20.

In a period 1104, the liquid refrigerants 20 is circulated through the prism cooling device 19, and the first and second element cooling devices 21 and 26.

At a time point 1105, circulation of the liquid refrigerant 20 through the prism cooling device 19, and the first and second element cooling devices 21 and 26 is stopped.

At a time point 1106, circulation of the liquid refrigerant 20 through the prism cooling device 19, and the first and second element cooling devices 21 and 26 is restarted.

At a time point 1107, circulation of the liquid refrigerant 20 through the prism cooling device 19, and the first and second element cooling devices 21 and 26 is stopped.

At a time point 1108, circulation of the liquid refrigerant 20 through only the first element cooling device 21 is restarted.

At a time point 1109, circulation of the liquid refrigerant 20 through the first element cooling device 21 is stopped.

At a time point 1110, circulation of the liquid refrigerant 20 through only the second element cooling device 26 is restarted.

As can be seen from FIG. 11, circulation of the liquid refrigerant 20 enhances the cooling effect. Furthermore, it is appreciated that a temperature of the image display element is stabilized by circulating the liquid refrigerant 20 through both the first and second element cooling devices 21 and 26.

Comparing the temperature 1102 at the display surface side of the image display element between the time points 1105 and 1106 to the temperature 1102 at the display surface side of the image display element between the time points 1108 and 1109, it is appreciated that the temperature at the display surface side of the image display element can be efficiently suppressed by only circulating the liquid refrigerant 20 in the first element cooling device 21. Similarly, comparing the temperature 1101 at the back face side of the image display element between the time points 1105 and 1106 to the temperature 1101 at the back face of the image display element at the point 1110 or later, it is appreciated that the temperature at the back face side of the image display element can be efficiently suppressed by only circulating the liquid refrigerant 20 in the second element cooling device 26.

In this manner, even when either the first element cooling device 21 or the second element cooling device 26 is solely used, the image display element can be efficiently cooled.

It is found that when the liquid refrigerant 20 is circulated in both the first and second element cooling devices 21 and 26, respective temperatures at back face and display face sides of the image display element can be sufficiently suppressed as compared to a tolerance temperature of the image display element. Therefore, no problems are caused even if the optical output from the light source lamp unit 1 (FIG. 1) is increased.

Figure 12:
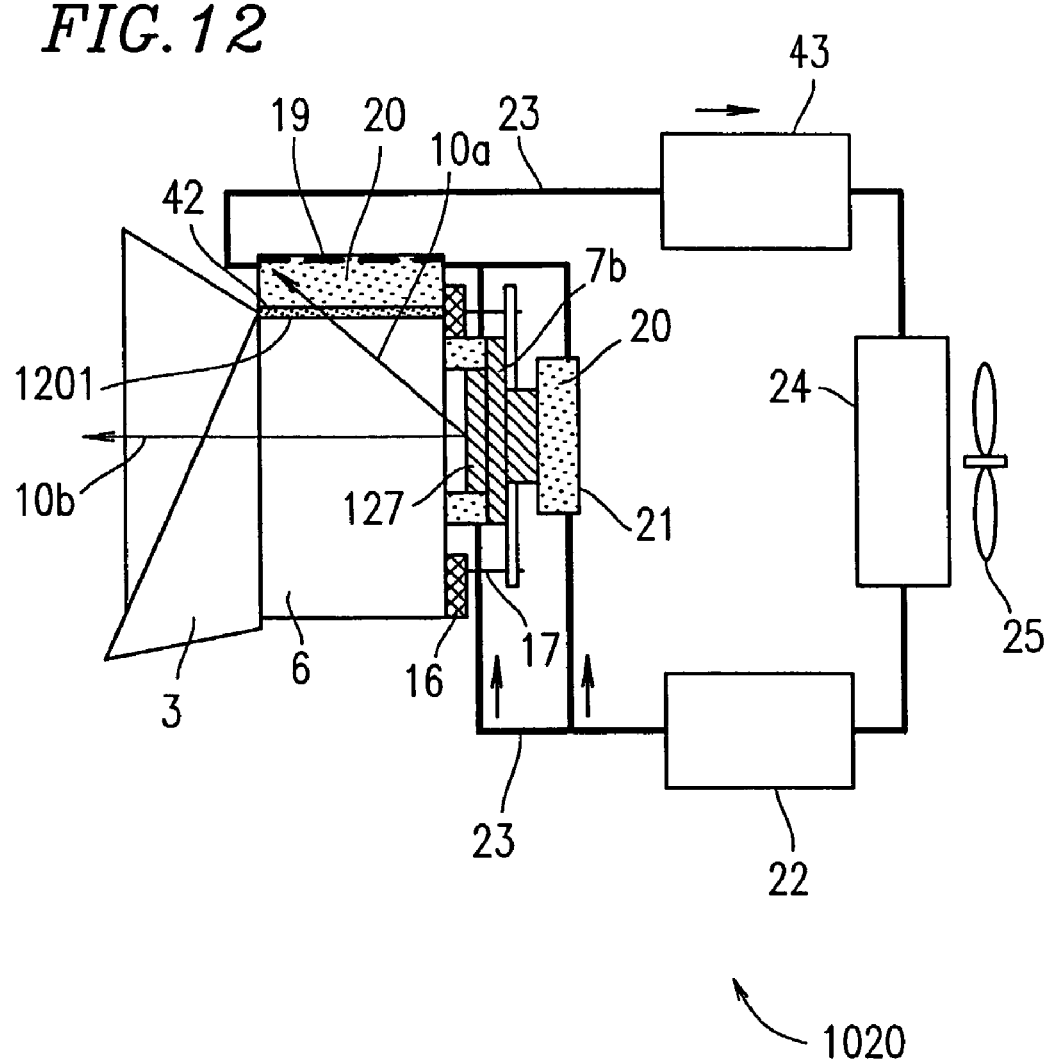
FIG. 12 is a view showing a cooling structure 1020 according to a variation of an embodiment of the present invention.

FIG. 12 illustrates a cooling structure 1020 according to a variation of the embodiment of the present invention. The cooling structure 1020 can be used in the projection-type imaging device 1000 (FIG. 1) instead of the cooling structure 1010 (FIG. 2).

The cooling structure 1020 is different from the cooling structure 1010 in that transparent glass 42 is provided between the prism cooling device 19 and the color separation/color combining prism 6 and an air chamber 43 is provided so as to be connected to the pipeline tube 23.

The transparent glass 42 is joined to the top face of the color separation/color combining prism 6 by a transparent adhesive 1201. As described with reference to FIG. 5, the color separation/color combining prism 6 includes three prisms 6a–6c. Therefore, there are slight differences in levels between the three prisms 6a–6c. By providing the transparent glass 42 on the top face of the color separation/color combining prism 6, even if there are slight differences in level on the surface, the junction of the prism cooling device 19 and the color separation/color combining prism 6 are facilitated.

In the cooling structure 1020, the liquid refrigerant 20 is optically coupled to the color separation/color combining prism 6 via the transparent glass 42 and the transparent adhesive 1201. Thus, the extraneous light 10a can be guided through the liquid refrigerant 20 to the prism cooling device 19 (an absorption section).

The air chamber 43 is a device for trapping the air (air bubbles) coming into the circulation path of the liquid refrigerant 20 and storing it. When air comes into the circulation path, it becomes difficult to flow the liquid refrigerant 20 or heat exchange efficiency will be reduced.

It should be noted that the air chamber 43 can be provided as a liquid collection section used for replacement or replenishment of the liquid refrigerant 20.

Figure 13A:
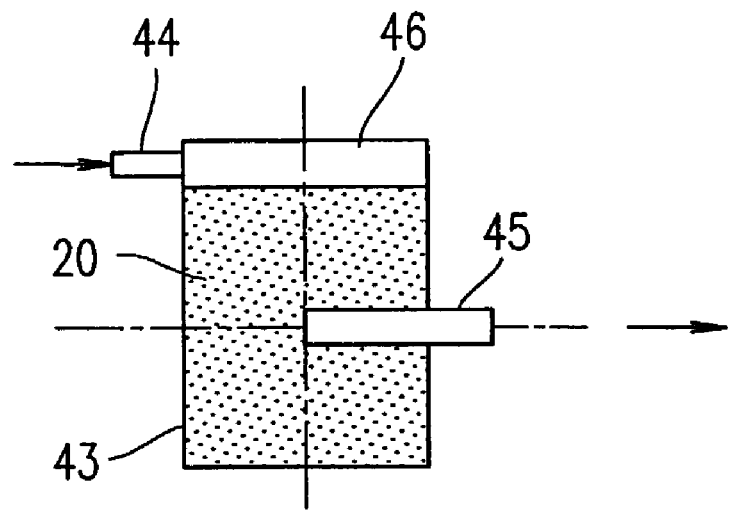
FIG. 13A is a cross-sectional view showing an example of a configuration of an air chamber 43.

FIG. 13A is a cross-sectional view showing an example of a configuration of the air chamber 43. The air chamber 43 is a liquid container having a box-like shape. The liquid refrigerant 20 is injected from a refrigerant inlet 44, stored in the container of the air chamber 43, and is guided from a refrigerant outlet 45 into the radiator 24 (FIG. 12). FIG. 13A shows a state of the liquid refrigerant 20 in the case where the projection-type imaging device 1000 (FIG. 1) is positioned on a horizontal plane.

When the liquid refrigerant 20 includes air 46, the air 46 stays in an upper part of the air chamber 43 due to buoyancy thereof. Since the refrigerant outlet 45 is positioned at about the middle of the air chamber 43 in a height direction (in a top to bottom direction in FIG. 13A), the air 46 does not come out from the refrigerant outlet 45 (i.e., the air 46 is not reintroduced into the circulation path of the liquid refrigerant 20). Even if the air chamber 43 is placed upside down from the state shown in FIG. 13A, it is apparent that the same effect can be achieved.

Figure 13B:
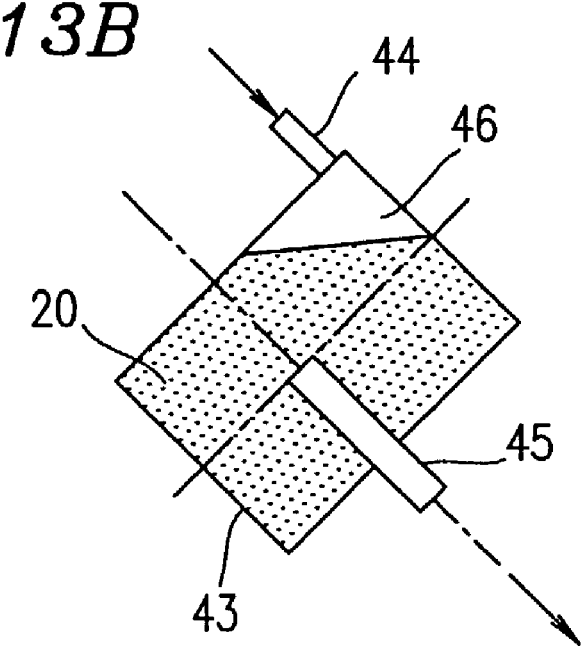
FIG. 13B is a view showing a state of a liquid refrigerant 20 in the case where the air chamber 43 is positioned in a slanted manner.

FIG. 13B shows a state of the liquid refrigerant 20 in the case where the air chamber 43 is positioned in a slanted manner. Such a state can be provided, for example, when the projection-type imaging device 1000 is placed on an inclined plane. In the state shown in FIG. 13B, the air 46 also stays in the upper part of the air chamber 43 (a direction opposite to that along which gravity works).

In this manner, by providing the air chamber 43, the air 46 is prevented from coming into the circulation path of the liquid refrigerant 20 regardless of an installation direction of the projection-type imaging device 1000. Therefore, satisfactory flow of the liquid refrigerant 20 is secured and heat exchange efficiency can be prevented from being reduced.

Figure 14A:
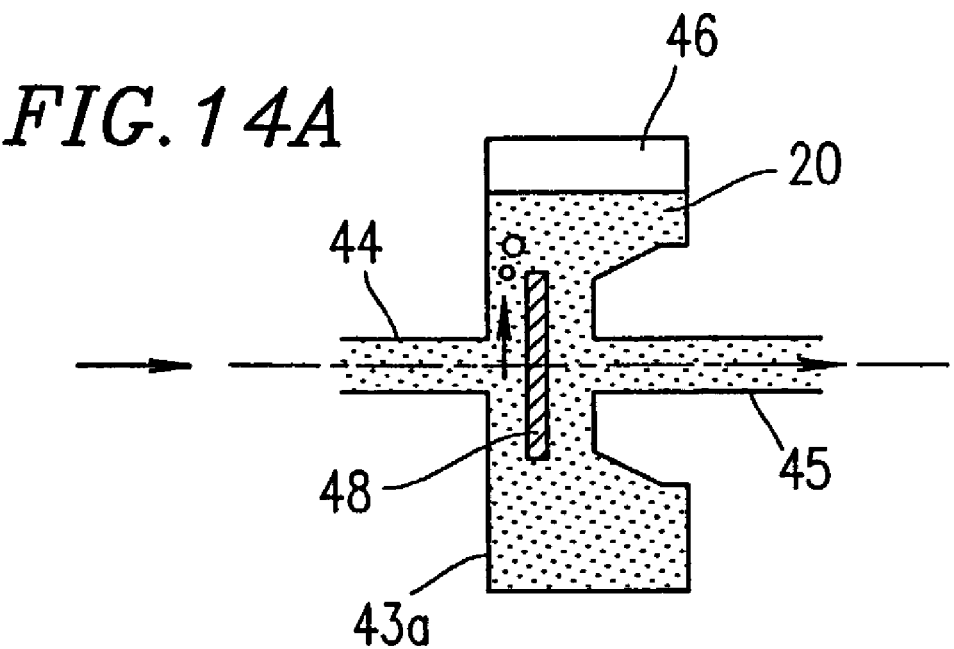

FIG. 14A is a cross-sectional view showing an example of a configuration of an air chamber 43a. The air chamber 43a can be used in the cooling structure 1020 (FIG. 12) instead of the air chamber 43 shown in FIGS. 13A and 13B.

The air chamber 43a has a cylindrical shape. An air stopper 48 is fixed in the air chamber 43a by a support member (not shown). In FIG. 14A, the liquid refrigerant 20 flows from the refrigerant inlet 44 as indicated by an arrow. When the air 46 becomes mixed with the liquid refrigerant 20, the air 46 hits the air stopper 48 and then moves so as to stay in an upper part of an air chamber 47 due to buoyancy thereof. Therefore, the air 46 does not come out from the refrigerant outlet 45 (i.e., the air 46 is not reintroduced into the circulation path of the liquid refrigerant 20).

Figure 14B:
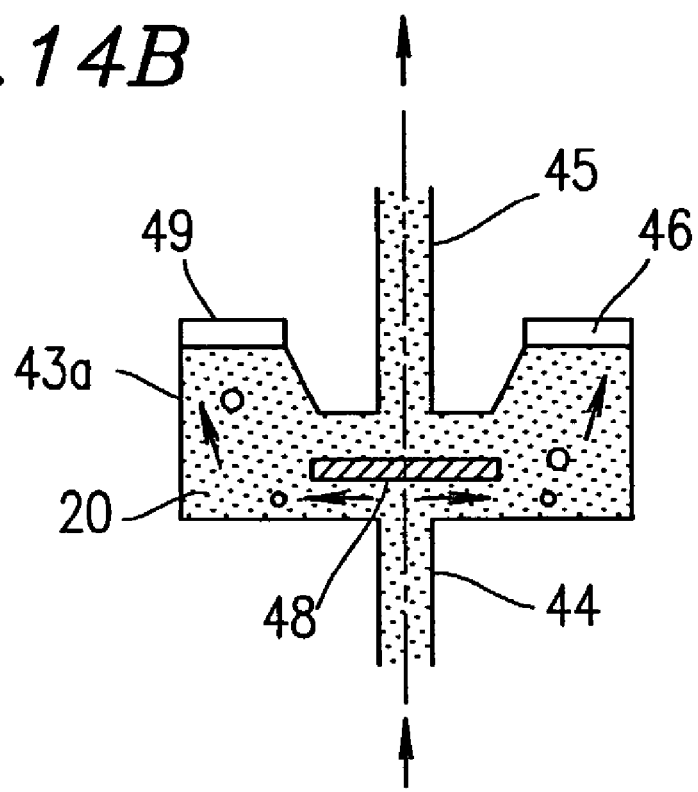
FIG. 14B is a view showing a state of the air chamber 43a positioned in a manner differing from the manner shown in FIG. 14A.

FIG. 14B shows a state of the air chamber 43a placed in a manner differing from the manner shown in FIG. 14A. The underside in FIG. 14B corresponds to the left side in FIG. 14A.

In FIG. 14B, the liquid refrigerant 20 flows from the refrigerant inlet 44 as indicated by an arrow. When the air 46 becomes mixed with the liquid refrigerant 20, the air 46 hits the air stopper 48 and then moves so as to stay in a protrusion portion 49 of the air chamber 47 due to buoyancy thereof. Therefore, the air 46 does not come out from the refrigerant outlet 45 (i.e., the air 46 is not reintroduced into the circulation path of the liquid refrigerant 20).

With the air chamber 43a, the air 46 can be prevented from coming into the circulation path of the liquid refrigerant 20 regardless of the installation direction of the projection-type imaging device 1000. Therefore, satisfactory flow of the liquid refrigerant 20 is secured and heat exchange efficiency can be prevented from being reduced.

It should be noted that in FIG. 12, the air chamber 43 can be provided between the radiator 24 and the pump 22. The air chamber 43 is preferably provided before (at an upstream side of) the pump 22.

Figure 15:
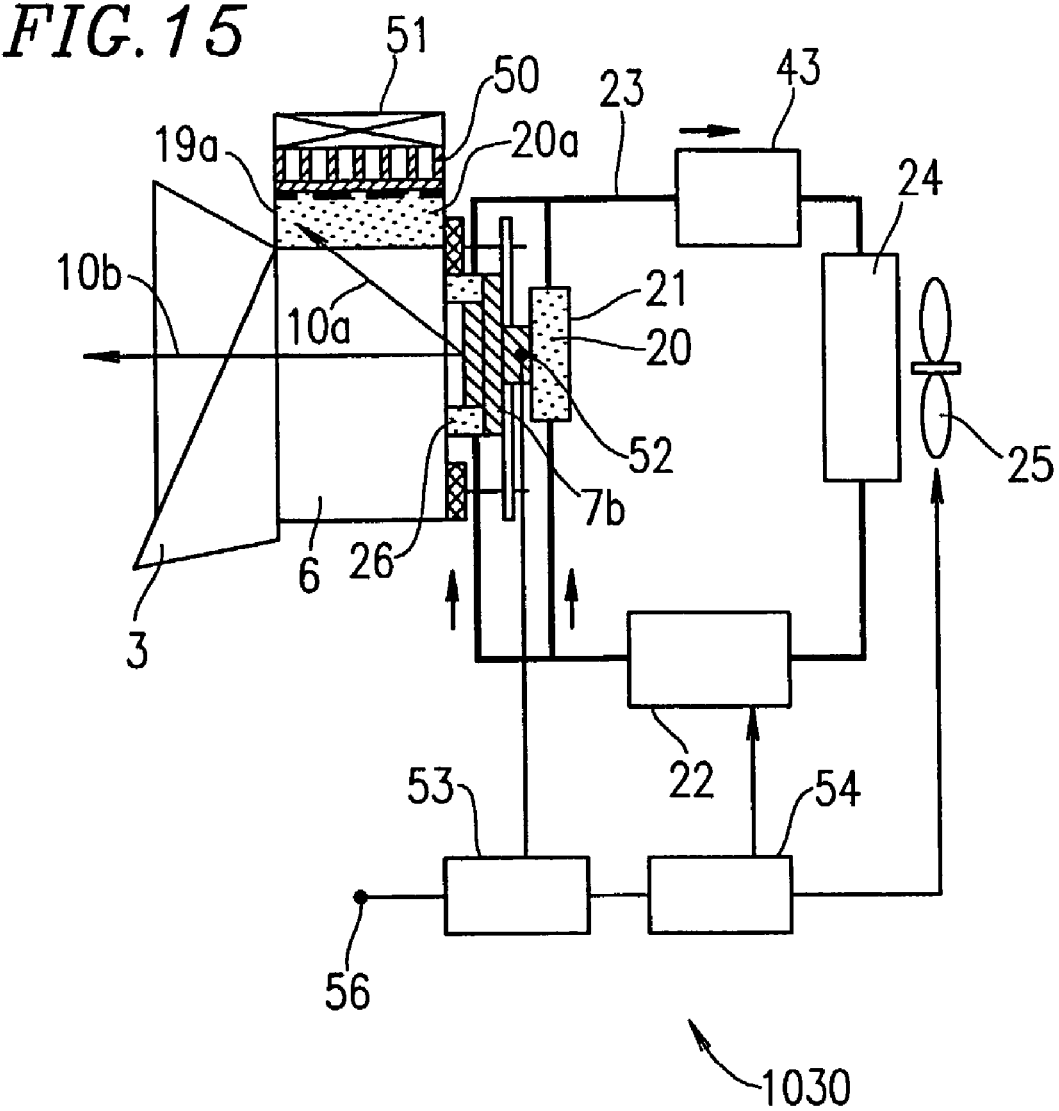
FIG. 15 is a view showing a cooling structure 1030 according to a variation of an embodiment of the present invention.

FIG. 15 shows a cooling structure 1030 according to a variation of the embodiment of the present invention. The cooling structure 1030 can be used in the projection-type imaging device 1000 (FIG. 1) of the present invention instead of the cooling structure 1010 (FIG. 2).

The cooling structure 1030 is different from the cooling structure 1010 in that the liquid refrigerant in the prism cooling device is not circulated and the cooling fan 25 is controlled according to a temperature in the vicinity of the image display element 7b.

In the cooling structure 1030, a prism cooling device 19a is provided instead of the prism cooling device 19 of the cooling structure 1010. The prism cooling device 19a is filled with a liquid refrigerant 20a. Since the prism cooling device 19a is not connected to the pipeline tube 23, the liquid refrigerant 20a is not circulated.

A prism heat sink (fins) 50 is formed on a top face of the prism cooling device 19a as a radiator for radiating heat from the liquid refrigerant 20a into the ambient air. A heat sink fan 51 is further placed on top of the prism heat sink 50. The heat sink fan 51 has a function of enhancing heat radiation efficiency by stirring the air around the prism heat sink 50.

The liquid refrigerant 20a is transparent and is optically coupled to the color separation/color combining prism 6. Therefore, the prism cooling device 19a can function as an absorption section for absorbing the extraneous light 10. Furthermore, the prism cooling device 19a function as a cooling section for cooling the absorption section by the refrigerant 20a and also functions as a cooling section for cooling the color separation/color combining prism 6 by the liquid refrigerant 20a.

Needless to say, the extraneous light 10a is not created when the image display element 7b is not a micromirror-type image display element, and thus the prism cooling device 19a does not function as an absorption section for absorbing the extraneous light 10a. In this case, the prism cooling device 19a still functions as the cooling section for cooling the color separation/color combining prism 6 by the liquid refrigerant 20a.

In general, the liquid refrigerant having an index of refraction which is completely equal to an index of refraction of the glass has high viscosity. Therefore, in order to circulate the liquid refrigerant, a high powered pump is required. However, in the cooling structure 1030, the liquid refrigerant 20a is not required to be circulated. Therefore, in the cooling structure 1030, the liquid refrigerant 20a having an index of refraction which is completely equal to an index of refraction of the glass can be used without enhancing performance of the pump 22 so as to circulate the liquid refrigerant having high viscosity.

Temperature detectors 52 and 56 respectively detect a temperature in the vicinity of the image display element 7b and a temperature around the projection-type imaging device 1000. Output from the temperature detectors 52 and 56 are input to a control circuit 53.

The control circuit 53 instructs a drive circuit 54, based on the temperature in the vicinity of the image display element 7b and the temperature around the projection-type imaging device 1000, by means of a signal representing a suitable flow rate of the liquid refrigerant 20 and a signal representing whether or not the cooling fan 25 should be operated.

The drive circuit 54 drives the pump 22 based on these signals.

In the radiator 24, the quantity (SI unit system) of heat exchanged between the liquid refrigerant 20 and a surface (e.g., an inner surface of the radiator 24) which is in contact with the liquid refrigerant 20 is given by (Expression 1).

$$Q = V * \rho * Cp * \Delta T \quad \text{(Expression 1),}$$

where
- Q: quantity of heat to be exchanged [W],
- V: a flow rate of the liquid refrigerant 20 [m³/s],
- ρ: density of the liquid refrigerant 20 [Kg/M³],
- Cp: specific heat of the liquid refrigerant 20 [KJ/Kg.° C.], and
- ΔT: a temperature difference (° C.).

In the case where the liquid refrigerant 20 is water, Cp=4.18.

In this manner, the quantity of heat to be exchanged depends on flow rate V of the liquid refrigerant 20.

In the cooling structure 1030, a circulation flow rate of the liquid refrigerant 20 is variably controlled according to an ambient temperature. For example, when the ambient temperature is low, the circulation flow rate of the liquid refrigerant 20 is controlled so as to be low, and when the ambient temperature is high, the circulation flow rate of the liquid refrigerant 20 is controlled so as to be high. This allows the temperatures of the reflection-type image display element 7 and/or the color separation/color combining prism 6 to be optimally controlled.

Alternatively, whether the cooling fan 25 is operated or stopped can be controlled according to the ambient temperature. When the ambient temperature is low, the number of rotations of each of the cooling fan 25 and pump 22 can be lowered, thereby lowering the noise of the projection-type imaging device 1000.

The inventors of the present invention carried out an experiment for measuring cooling performance data (temperature data) for the purpose of verifying effectiveness of the prism heat sink 50 and heat sink fan 51 of the cooling structure 1030 according to the embodiment of the present invention shown in FIG. 15.

Figure 16:
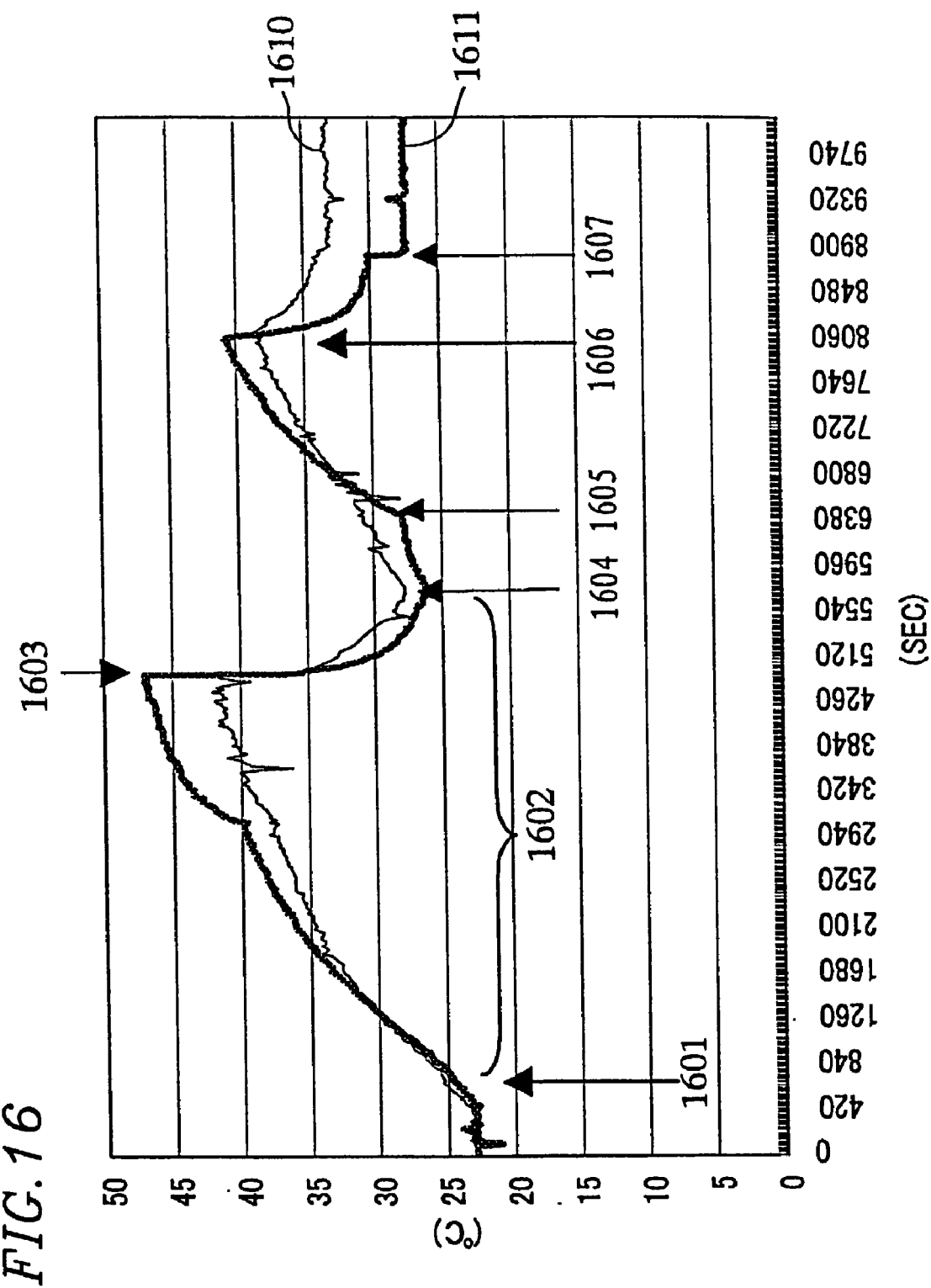
FIG. 16 is a diagram showing cooling performance data for a prism heat sink 50 and a heat sink fan 51 both shown in FIG. 15.

FIG. 16 shows cooling performance data for the prism heat sink 50 and the heat sink fan 51 both shown in FIG. 15. This experiment was carried out on the cooling structure 1020 shown in FIG. 12 in which the prism heat sink 50 and the heat sink fan 51 are placed on the prism cooling device 19. In FIG. 16, the horizontal axis denotes elapsed time and the vertical axis denotes temperature. In FIG. 16, a thin line, reference numeral 1610 represents the temperature overtime at the top of the color separation/color combining prism 6, and a bold line, reference numeral 1611 represents the temperature overtime at the top of the prism cooling device 19. The experimental conditions were as follows.

Liquid refrigerant 20: a water solution of ethylene glycol
Circulation flow rate: about 100 cc/min.
Optical output of the light source lamp unit 1 (FIG. 1): 3000 ANSI lumen-hours Initially, the xenon lamp 101 (FIG. 1) was lit up (time point 1601) in the state where the prism heat sink 50 and the heat sink fan 51 were not placed on the prism cooling device 19 and the liquid refrigerant 20 was not circulated. In this state, the temperature 1610 at the top of the color separation/color combining prism 6 and the temperature 1611 at the top of the prism cooling device 19 were rapidly increased (period 1602). At a time point 1603, in order to prevent breakage of the projection-type imaging device, the xenon lamp 101 was turned off and the projection-type imaging device was naturally cooled.

At a time point 1604, the xenon lamp 101 was lit up with the prism heat sink 50 and the heat sink fan 51 placed on the prism cooling device 19, and the heat sink fan 51 was operated. At this point, the liquid refrigerant 20 was not circulated.

At a time point 1605, the operation of the heat sink fan 51 was stopped.

At a time point 1606, the heat sink fan 51 was operated. It is appreciated that the operation of the heat sink fan 51 causes rapid reduction in the temperature 1610 at the top of the color separation/color combining prism 6 and the temperature 1611 at the top of the prism cooling device 19.

At a time point 1607, the liquid refrigerant 20 was circulated.

From FIG. 16, it is appreciated that by operating the heat sink fan 51, the color separation/color combining prism 6 and the prism cooling device 19 can be efficiently cooled. Further, it is appreciated that in the cooling structure 1020 shown in FIG. 12, by circulating the liquid refrigerant 20, the color separation/color combining prism 6 and the prism cooling device 19 can be further efficiently cooled.

From FIGS. 11 and 16, it is appreciated that according to the present invention, the image display elements 7a–7c and the color separation/color combining prism 6 can be efficiently cooled, and no problem is caused by enhancing optical output of the light source lamp unit 1.

It goes without saying that in the above-described embodiments and variations thereof, a cooling structure of a projection-type imaging device can be formed by suitably combining components shown in the different drawings. For example, providing the air chamber 43 shown in FIG. 12 to the cooling structure 1010 (FIG. 2) or the cooling structure 1030 (FIG. 15) or providing the temperature detectors 52 and 56, the control circuit 53 and the drive circuit 54 shown in FIG. 15 to the cooling structure 1010 (FIG. 2) or the cooling structure 1020 (FIG. 12) are within the scope of the present invention.

INDUSTRIAL APPLICABILITY

As described above, the projection-type imaging device of the present invention includes the absorption section for absorbing extraneous light (second light) which is reflected by the display surface of the micromirror-type image display element and is transmitted by the prism. This absorption section is cooled by the liquid refrigerant. Since the liquid refrigerant has high cooling effectiveness as compared to air, the absorption section can be efficiently cooled.

Further, the extraneous light reaches the absorption section via the liquid refrigerant optically coupled to the prism. Therefore, the prism does not require a configuration for guiding the extraneous light to the absorption section, and thus the prism can be made compact.

Furthermore, the projection-type imaging device of the present invention includes the cooling section for cooling the prism, which transmits information light reflected by the display surface of the reflection-type image display element, by the liquid refrigerant. Since the liquid refrigerant has high cooling effectiveness as compared to air, the prism can be efficiently cooled.

Further still, the projection-type imaging device of the present invention includes the cooling section for cooling a surface of the reflection-type image display element opposed to the display surface by the liquid refrigerant. Since the liquid refrigerant has high cooling effectiveness as compared to air, the image display element can be efficiently cooled.

The invention claimed is:

1. A projection-type imaging device comprising:
   a light source optical system for emitting source light;
   an image display element having a display surface on which a plurality of micromirrors are placed, the image display element driving the plurality of micromirrors according to a control signal representing a prescribed image so as to reflect the source light incident on the display surface toward a first direction and a second direction differing from the first direction so as to obtain first light and second light, respectively;
   a prism for transmitting the first light and the second light;
   a projection optical system for projecting the first light transmitted by the prism;
   an absorption section for absorbing the second light transmitted by the prism; and
   a cooling section for cooling the absorption section by a liquid refrigerant,
   wherein the first light carries information on the prescribed image,
   the liquid refrigerant is optically coupled to the prism, and
   the second light reaches the absorption section via the liquid refrigerant.

2. A projection-type imaging device according to claim 1, further comprising a plurality of image display elements corresponding to respective ones of a plurality of primary color components, wherein the prism separates the source light into the plurality of primary color components and combines the first light for each of the primary color components.

3. A projection-type imaging device according to claim 1, wherein the cooling section includes a radiator for radiating heat of the liquid refrigerant into the air around the projection-type imaging device.

4. A projection-type imaging device according to claim 3, wherein the cooling section further includes a pump for circulating the liquid refrigerant through the absorption section and the radiator, and a pipeline forming a circulation path of the liquid refrigerant.

5. A projection-type imaging device according to claim 3, wherein fins are formed on a surface of the radiator, which is in contact with the air around the projection-type imaging device, and the cooling section further includes a cooling fan for stirring the air around the radiator so as to enhance radiation effectiveness.

6. A projection-type imaging device according to claim 4, wherein a circulation flow rate of the liquid refrigerant is variably controlled according to a temperature around the projection-type imaging device.

7. A projection-type imaging device according to claim 1, wherein the liquid refrigerant is optically coupled to the prism via transparent glass and a transparent adhesive.

8. A projection-type imaging device according to claim 1, wherein the absorption section is formed of a metal material.

9. A projection-type imaging device according to claim 1, wherein the absorption section has a surface for absorbing the second light, the surface for absorbing the second light being black.

10. A projection-type imaging device according to claim 1, wherein the absorption section has a surface in contact with the liquid refrigerant and fins are formed on the surface in contact with the liquid refrigerant.

11. A projection-type imaging device according to claim 1, wherein an index of refraction of the liquid refrigerant is substantially equal to an index of refraction of the prism.

12. A projection-type imaging device comprising:
   a light source optical system for emitting source light;
   an image display element having a display surface on which a prescribed image is displayed according to a control signal, the light source being reflected by the display surface so as to obtain information light which carries information on the prescribed image;
   a prism for transmitting the information light;
   a projection optical system for projecting the information light transmitted by the prism; and a cooling section for cooling the prism by a liquid refrigerant.

13. A projection-type imaging device according to claim 12, comprising a plurality of image display elements corresponding to respective ones of a plurality of primary color components, wherein the prism separates the source light into the plurality of primary color components and combines the information light for each of the primary color components.

14. A projection-type imaging device according to claim 12, wherein the cooling section includes a radiator for radiating heat of the liquid refrigerant into the air around the projection-type imaging device.

15. A projection-type imaging device according to claim 14, wherein the cooling section further includes a pump for circulating the liquid refrigerant through the absorption section and the radiator, and a pipeline forming a circulation path of the liquid refrigerant.

16. A projection-type imaging device according to claim 14, wherein fins are formed on a surface of the radiator, which is in contact with the air around the projection-type imaging device, and the cooling section further includes a cooling fan for stirring the air around the radiator so as to enhance radiation effectiveness.

17. A projection-type imaging device according to claim 15, wherein a circulation flow rate of the liquid refrigerant is variably controlled according to a temperature around the projection-type imaging device.

18. A projection-type imaging device comprising:
a light source optical system for emitting source light;
an image display element having a display surface on which a prescribed image is displayed according to a control signal, the light source being reflected by the display surface so as to obtain information light which carries information on the prescribed image;
a prism for transmitting the information light;
a projection optical system for projecting the information light transmitted by the prism; and
an element cooling section for cooling a surface of the image display element opposed to the display surface by a liquid refrigerant.

19. A projection-type imaging device according to claim 18, comprising a plurality of image display elements corresponding to respective ones of a plurality of primary color components, wherein the prism separates the source light into the plurality of primary color components and combines the information light for each of the primary color components.

20. A projection-type imaging device according to claim 18, wherein the element cooling section further cools surroundings of the display surface of the image display element.

21. A projection-type imaging device according to claim 18, wherein the liquid refrigerant is optically coupled to the display surface of the image display element and the prism, and the element cooling section further cools the display surface of the image display element with the liquid refrigerant.

22. A projection-type imaging device according to claim 18, wherein the element cooling section includes a pump for circulating the liquid refrigerant, a pipeline forming a circulation path of the liquid refrigerant, and a radiator for radiating heat of the liquid refrigerant into the air around the projection-type imaging device.

23. A projection-type imaging device according to claim 22, wherein the circulation flow rate of the liquid refrigerant is variably controlled according to a temperature around the projection-type imaging device.

24. A projection-type imaging device according to claim 18, wherein the element cooling section is formed of a metal material.

25. A projection-type imaging device according to claim 18, wherein the element cooling section has a surface in contact with the liquid refrigerant and fins are formed on the surface in contact with the liquid refrigerant.

26. A projection-type imaging device according to claim 21, wherein an index of refraction of the liquid refrigerant is substantially equal to an index of refraction of the prism.

27. A projection-type imaging device according to claim 21, wherein a portion of the element cooling section, which is in contact with the display surface of the image display element, is formed of an elastic material.

* * * * *